United States Patent
Ohtsuji

(10) Patent No.: US 10,387,380 B2
(45) Date of Patent: Aug. 20, 2019

(54) APPARATUS AND METHOD FOR INFORMATION PROCESSING

(71) Applicant: FUJITSU LIMITED, Kawasaki-shi, Kanagawa (JP)

(72) Inventor: Hiroki Ohtsuji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 15/786,671

(22) Filed: Oct. 18, 2017

(65) Prior Publication Data

US 2018/0143994 A1 May 24, 2018

(30) Foreign Application Priority Data

Nov. 21, 2016 (JP) .................................. 2016-225953

(51) Int. Cl.
*G06F 16/174* (2019.01)
*G06F 3/06* (2006.01)

(52) U.S. Cl.
CPC .......... *G06F 16/1748* (2019.01); *G06F 3/067* (2013.01); *G06F 3/0608* (2013.01); *G06F 3/0611* (2013.01); *G06F 3/0641* (2013.01); *G06F 3/0689* (2013.01)

(58) Field of Classification Search
CPC .................................................. G06F 16/1748
See application file for complete search history.

(56) References Cited

U.S. PATENT DOCUMENTS

| 10,133,503 B1* | 11/2018 | Colgrove ............... G06F 3/0641 |
| 2011/0191305 A1 | 8/2011 | Nakamura et al. |
| 2013/0282672 A1 | 10/2013 | Tashiro et al. |
| 2014/0122818 A1 | 5/2014 | Hayasaka et al. |

(Continued)

FOREIGN PATENT DOCUMENTS

| JP | 2000-195147 | 7/2000 |
| JP | 2012-523023 | 9/2012 |
| JP | 2014-175008 | 9/2014 |

(Continued)

OTHER PUBLICATIONS

"Introduction to the EMC XtremIO Storage Array (Ver. 4.0) A Detailed Review", EMC Corporation, Apr. 2015 (65 pages).

*Primary Examiner* — Kris E Mackes
(74) *Attorney, Agent, or Firm* — Fujitsu Patent Center

(57) ABSTRACT

An information processing apparatus includes an identifying unit and a determining unit. The identifying unit identifies write requests received from the same source at intervals each within a predetermined time period. The determining unit determines to perform a write operation employing first-method deduplication for a preset number of write requests selected amongst the write requests in reverse chronological order according to reception times thereof, and perform the write operation employing a second-method deduplication for the remaining write requests. The first-method deduplication includes postprocess deduplication while the second-method deduplication includes inline deduplication. The preset number is set based on a minimum interval of write requests sequentially issued from the source and time periods in the first-method deduplication and the second-method deduplication from the reception of each write request to the transmission of the response.

7 Claims, 26 Drawing Sheets

(56) References Cited

U.S. PATENT DOCUMENTS

2014/0258655 A1    9/2014  Park et al.
2017/0237633 A1*  8/2017  Hegde .................. H04L 43/028
                                                                    370/252

FOREIGN PATENT DOCUMENTS

JP        2015-528928    10/2015
WO      2013/157103    10/2013

* cited by examiner

121 HASH MANAGEMENT TABLE

| HASH VALUE | POINTER | COUNT VALUE |
|---|---|---|
| 0xA075C1 | CP : aaa... | 1 |
| 0x92DF59 | CP : bbb... | 3 |
| 0x815A01 | PBA : ccc... | 7 |
| ... | ... | ... |

FIG. 12
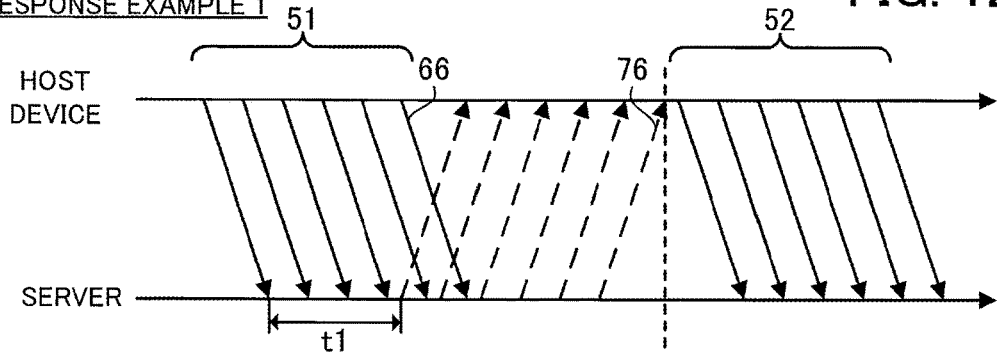
RESPONSE EXAMPLE 1
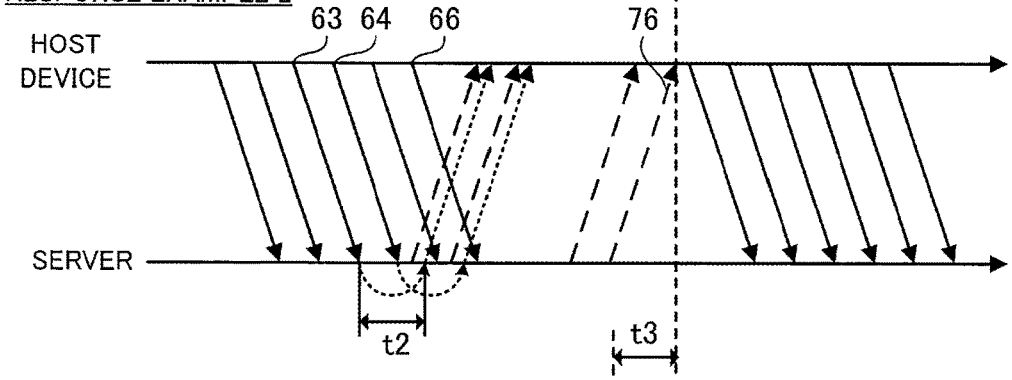
RESPONSE EXAMPLE 2
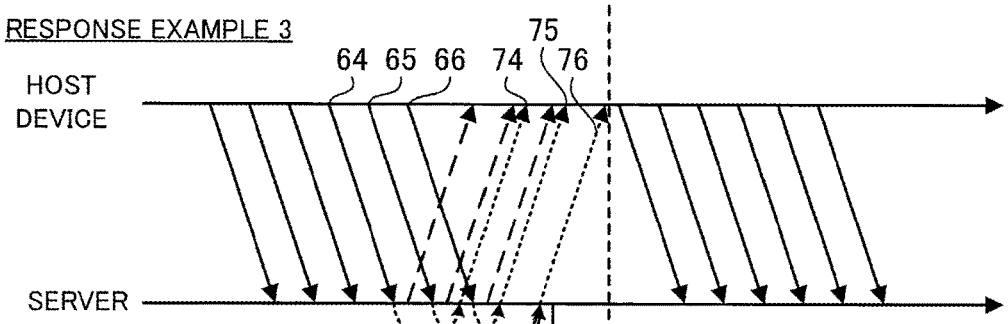
RESPONSE EXAMPLE 3
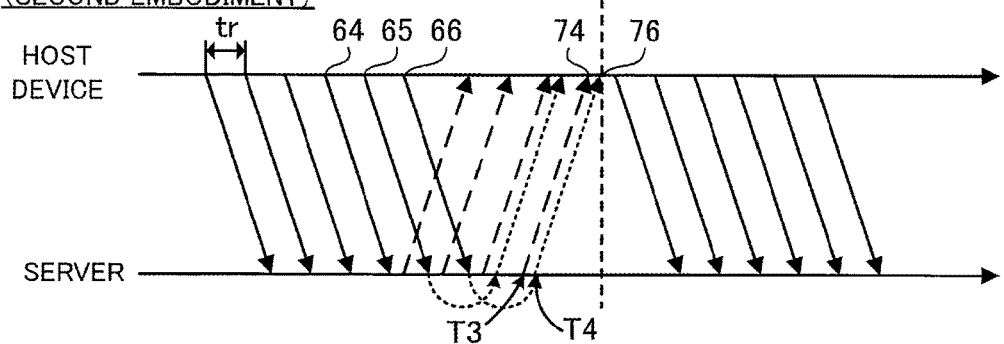
RESPONSE EXAMPLE 4 (SECOND EMBODIMENT)
→ WRITE COMMAND    ⇢ RESPONSE COMMAND (INLINE)    ⇠ RESPONSE COMMAND (POSTPROCESS)

FIG. 14

123 HISTORY TABLE

| COMMAND GROUP ID | RECEPTION TIME | RECEPTION INTERVAL |
|---|---|---|
| 1 | 6 | TI1 |
| 2 | 6 | TI2 |
| 3 | 6 | TI3 |
| ... | ... | ... |

APPARATUS AND METHOD FOR INFORMATION PROCESSING

CROSS-REFERENCE TO RELATED APPLICATION

This application is based upon and claims the benefit of priority of the prior Japanese Patent Application No. 2016-225953, filed on Nov. 21, 2016, the entire contents of which are incorporated herein by reference.

FIELD

The embodiments discussed herein are related to an apparatus and method for information processing.

BACKGROUND

A technology called "deduplication" for not storing duplicated copies of repeating data in a storage apparatus and using the storage area of the storage apparatus more efficiently is known as one of storage system technologies. When it comes to deduplication technology, generally two methods are known: inline and postprocess. With inline deduplication, data for which a write request has been issued is deduplicated and then stored in a storage apparatus before returning a response to the write request. Postprocess deduplication temporarily stores data requested to be written in a storage apparatus in its entirety and then returns a response, and deduplicates the stored data at a later time.

In addition, consideration has been given to employing both inline deduplication and postprocess deduplication together. There is provided, for example, a storage system that performs file-level inline deduplication under a predetermined condition and performs chunk-level postprocess deduplication on files from which duplicates have not been eliminated by the inline deduplication. There is also a proposed technique where a host computer issues a sequential access instruction to a disk storage apparatus.

International Publication Pamphlet No. WO 2013/157103
Japanese Laid-open Patent Publication No. 2000-195147

Postprocess deduplication has a shorter response time to a write request compared to inline deduplication because the deduplication process takes place at a later time. On the other hand, with postprocess deduplication, processing load imposed by the asynchronous and deferred deduplication process may impact the performance of response processing to write requests. Therefore, there remains the problem of how to use the inline and postprocess methods differently to shorten the response time while preventing an increase in processing load.

It is sometimes the case that, for example, a plurality of write requests are sequentially transmitted from the same source. In such a case, the processing efficiency on the source side is improved by shortening the overall response time to the sequential write requests. However, there is the challenge of determining whether to employ inline deduplication for which write requests and postprocess deduplication for which write requests in order to reduce the processing load on an apparatus receiving the write requests as much as possible while shortening the overall response time.

SUMMARY

According to an aspect, there is provided an information processing apparatus including a processor configured to perform a procedure that includes identifying a plurality of write requests received from the same source at intervals each within a predetermined time period; and determining to perform a write operation employing a first-method deduplication process for first write requests that are a preset number of write requests selected amongst the plurality of write requests in reverse chronological order according to reception times individually associated with the plurality of write requests, and perform the write operation employing a second-method deduplication process for second write requests that are rest of the plurality of write requests other than the first write requests. The first-method deduplication process includes writing first write data to a storage area and transmitting a response, and deduplicating the first write data in the storage area at a later time. The second-method deduplication process includes deduplicating second write data, writing the deduplicated second write data to the storage area, and then transmitting the response. The preset number is set based on a minimum interval of write requests sequentially issued from the source, a time period in the first-method deduplication process from reception of each write request to transmission of the response, and a time period in the second-method deduplication process from reception of each write request to transmission of the response.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates responses to sequential command groups;

FIG. 14 illustrates an example of a data structure of a history table;

DESCRIPTION OF EMBODIMENTS

Figure 1:
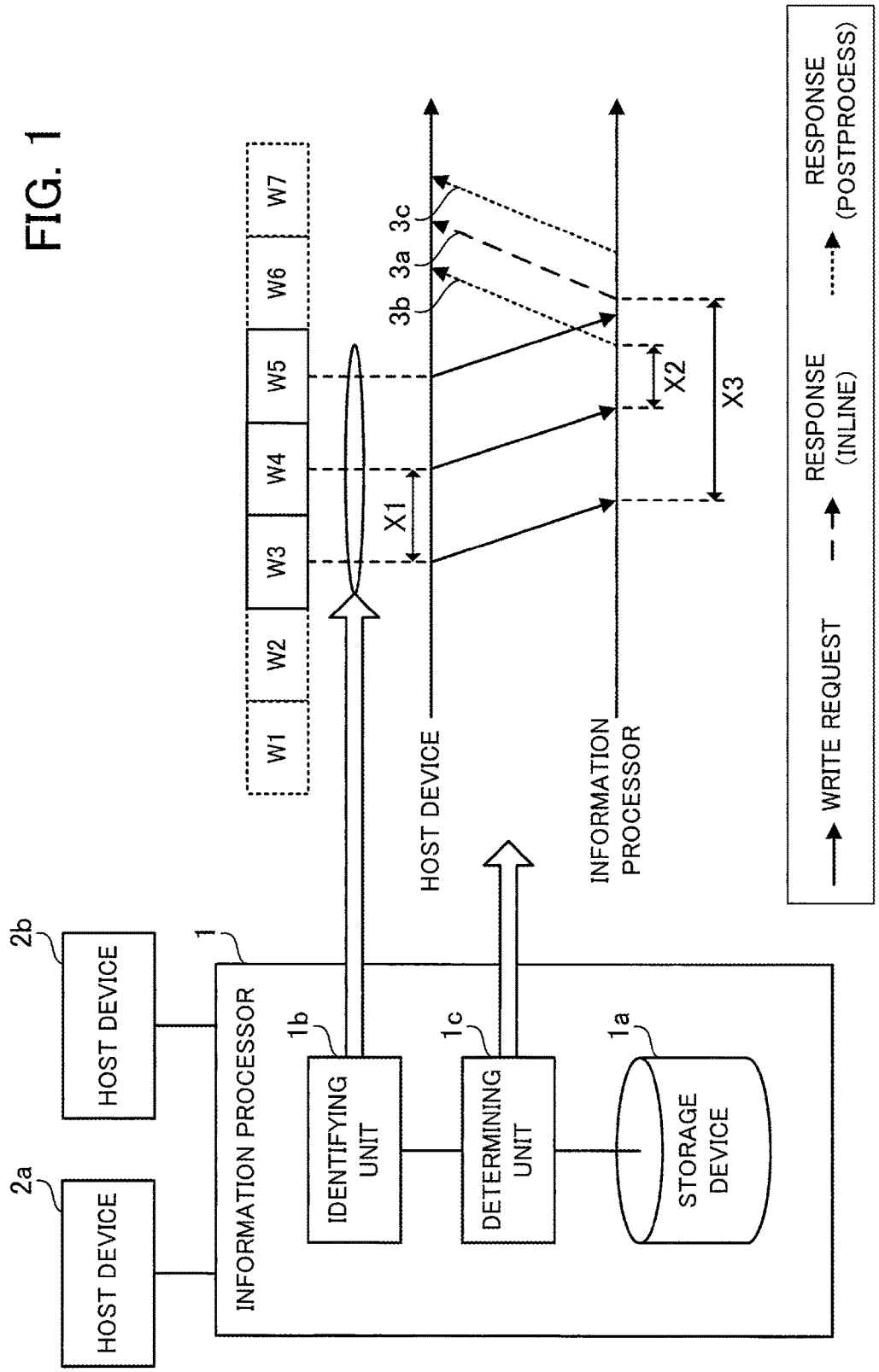
FIG. 1 illustrates an information processor according to a first embodiment.

Several embodiments will be described below with reference to the accompanying drawings, wherein like reference numerals refer to like elements throughout.

(a) First Embodiment

FIG. 1 illustrates an information processor according to a first embodiment. An information processor 1 of FIG. 1 is connected to host devices 2a and 2b, and has a write control function of writing data to a storage area in response to a write request from each of the host devices 2a and 2b. Assume for example that, in FIG. 1, the information processor 1 has a write control function of writing data to a storage device 1a. The storage device 1a may be installed internally to the information processor 1, as illustrated in FIG. 1, or may be connected externally to the information processor 1.

In addition, the information processor 1 is able to selectively perform a postprocess deduplication process (a first-method deduplication process) and an inline deduplication process (a second-method deduplication process). The postprocess deduplication process includes writing write data to the storage device 1a, transmitting a response to a write requestor, and eliminating duplicates from the write data stored in the storage device 1a at a later time. The inline deduplication process includes eliminating duplicates from write data for which a write request has been issued, writing the deduplicated write data to the storage device 1a, and transmitting a response to the write request.

Of the two methods above, the postprocess deduplication process has a shorter response time to a write request compared to the inline deduplication process because the deduplication process takes place at a later time. On the other hand, with the postprocess deduplication process, processing load imposed by the asynchronous and deferred deduplication process may impact the performance of response processing to write requests.

The information processor 1 includes an identifying unit 1b and a determining unit 1c. Processes carried out by the identifying unit 1b and the determining unit 1c are implemented, for example, by a processor executing a predetermined program. The processor may include, for example, a central processing unit (CPU), a digital signal processor (DSP), an application specific integrated circuit (ASIC), and a field programmable gate array (FPGA).

The identifying unit 1b identifies a plurality of write requests received from the same source at intervals each within a predetermined time period. FIG. 1 illustrates a case where the information processor 1 has sequentially received write requests W1 to W7. Then, assume that the identifying unit 1b has identified, for example, the write requests W3 to W5 issued from the host device 2a as a plurality of write requests that meet the above-mentioned conditions. Note that the conditions used by the identifying unit 1b to identify a plurality of write requests may include other conditions, for example, a logical storage area or address range to which data is to be written being the same.

The determining unit 1c determines to perform a write operation employing the postprocess deduplication process for first write requests which are a preset number, S, of write requests selected amongst the identified write requests W3 to W5 in reverse chronological order according to the reception time thereof. In addition, the determining unit 1c determines to perform a write operation employing the inline deduplication process for second write requests which are the rest of the write requests W3 to W5.

The preset number S is set based on an interval X1, and response times X2 and X3. The interval X1 indicates the minimum interval of write requests sequentially issued from the source. The response time X2 indicates the time period in the postprocess deduplication process from the reception of each write request to the transmission of a response to the write request. The response time X3 indicates the time period in the inline deduplication process from the reception of each write request to the transmission of a response to the write request.

The use of these parameters allows the preset number S to be set in such a manner so as to shorten the overall response time to the identified write requests W3 to W5 while minimizing the number of write requests whose data is to be processed by postprocess deduplication that causes increased processing load. As a result, the determining unit 1c is able to shorten the overall response time to the identified write requests W3 to W5 while keeping the processing load low. In addition, the overall response time to the write requests W3 to W5 being shortened allows the source host device 2a to start early processing to be executed upon receiving the responses. This results in improving the processing efficiency of the host device 2a.

In the example of FIG. 1, the preset number is set to "2". In this case, the determining unit 1c determines to perform a write operation using the postprocess deduplication process for the write requests W4 and W5 and perform a write operation using the inline deduplication process for the write request W3. Due to the application of the postprocess deduplication process to the write request W5, the transmission time of a response 3c to the last write request W5 amongst the write requests W3 to W5 becomes earlier compared to the case of applying the inline deduplication process thereto. In like fashion, the transmission time of a response 3b to the write request W4 adjacent to the write request W5 becomes earlier due to the application of the postprocess deduplication process to the write request W4 compared to the case of applying the inline deduplication process thereto.

On the other hand, the transmission time of a response 3a to the write request W3 does not come later than the transmission time of the response 3c to the last write request W5. This means that applying the postprocess deduplication process also to the write request W3 does not have any effect on shortening the overall response time to the write requests W3 to W5. Therefore, by applying the inline deduplication process to the write request W3, it is possible to reduce the processing load of the information processor 1 without diminishing the effect of shortening the overall response time to the write requests W3 to W5.

That is, the preset number S is set in such a manner that the transmission time of the response 3a to the last write request W3 to which the inline deduplication process is applied falls on or before, but closest to, the transmission time of the response 3c ("TM") to the last write request W5 to which the postprocess deduplication process is applied. The preset number S is calculated from the relationship among the above-mentioned interval X1 and response times X2 and X3. Note that the preset number S may be calculated based on the interval X1 and the response times X2 and X3 each time determination is made by the determining unit 1c. In addition, because the interval X1 and the response times X2 and X3 are values that are possible to obtain in advance as the performance of the corresponding devices, the preset number S may be calculated in advance and stored in the information processor 1, and then referred to by the determining unit 1c.

(b) Second Embodiment

Figure 2:
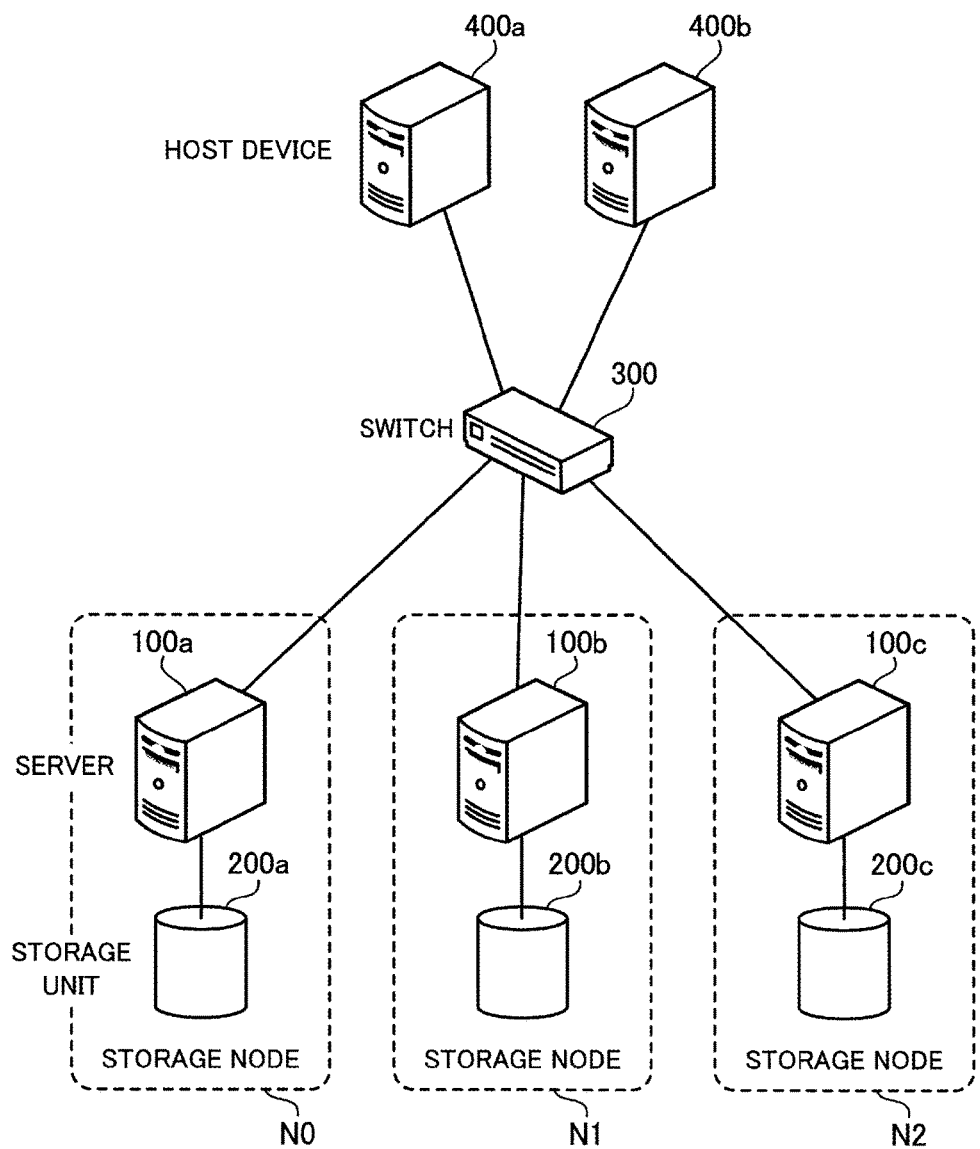
FIG. 2 illustrates a storage system according to a second embodiment.

FIG. 2 illustrates a storage system according to a second embodiment. The storage system of FIG. 2 includes servers 100a to 100c, storage units 200a to 200c, a switch 300, and host devices 400a and 400b. The servers 100a to 100c are individually connected to the switch 300 and capable of communicate with each other via the switch 300. In addition, the storage unit 200a is connected to the server 100a; the storage unit 200b is connected to the server 100b; and the storage unit 200c is connected to the server 100c. The server 100a is a storage control device for controlling access to the storage unit 200a. In like fashion, the server 100b is a storage control device for controlling access to the storage unit 200b, and server 100c is a storage control device for controlling access to the storage unit 200c.

Each of the storage units 200a to 200c houses a single or plurality of non-volatile storage devices. Assume in this embodiment that each of the storage units 200a to 200c houses a plurality of solid state drives (SSDs). Note that the server 100a and the storage unit 200a, the server 100b and the storage unit 200b, and the server 100c and the storage unit 200c belong to storage nodes N0, N1, and N2, respectively.

The host devices 400a and 400b are individually connected to the switch 300 and able to communicate with at least one of the servers 100a to 100c via the switch 300. The host devices 400a and 400b individually transmit, to at least one of the servers 100a to 100c, an access request to a logical volume provided by the servers 100a to 100c. Herewith, the host devices 400a and 400b are able to access the logical volume. The relationships among the host devices 400a and 400b and the servers 100a to 100c may be determined, for example, in the following manner. The host device 400a transmits, to a predetermined one of the servers 100a to 100c, an access request to a logical volume provided by the servers 100a to 100c. In addition, the host device 400b transmits, to a predetermined different one of the servers 100a to 100c, an access request to a different logical volume provided by the servers 100a to 100c. Note that these logical volumes are created from physical storage resources of the storage units 200a to 200c.

The switch 300 relays data among the servers 100a to 100c as well as among the host devices 400a and 400b and the servers 100a and 100c. Note that, for example, Infini-Band (registered trademark) is used to provide connection among the servers 100a to 100c and among the host devices 400a and 400b and the servers 100a to 100c. Communication among the servers 100a to 100c and communication among the host devices 400a and 400b and the server 100a to 100c may be established via individual discrete networks.

In the example of FIG. 2 above, the three servers 100a to 100c are deployed; however, any number of servers greater than or equal to two may be deployed in the storage system. In addition, in FIG. 2, the two host devices 400a and 400b are deployed; however, any number of host devices greater than or equal to one may be deployed in the storage system. Further, in FIG. 2, the storage units 200a to 200c are connected to the servers 100a to 100c, respectively; however, shared storage may be connected to the servers 100a to 100c.

Note that the term "server 100" may be used in the following description when no distinction is made among the servers 100a to 100c. In addition, the term "cache 110 of the server 100" may be used when no distinction is made among caches 110a to 110c of the servers 100a to 100c, respectively. Similarly, the term "storage unit 200" may be used when no distinction is made among the storage units 200a to 200c, and the term "host device 400" may be used when no distinction is made between the host devices 400a and 400b.

Figure 3:
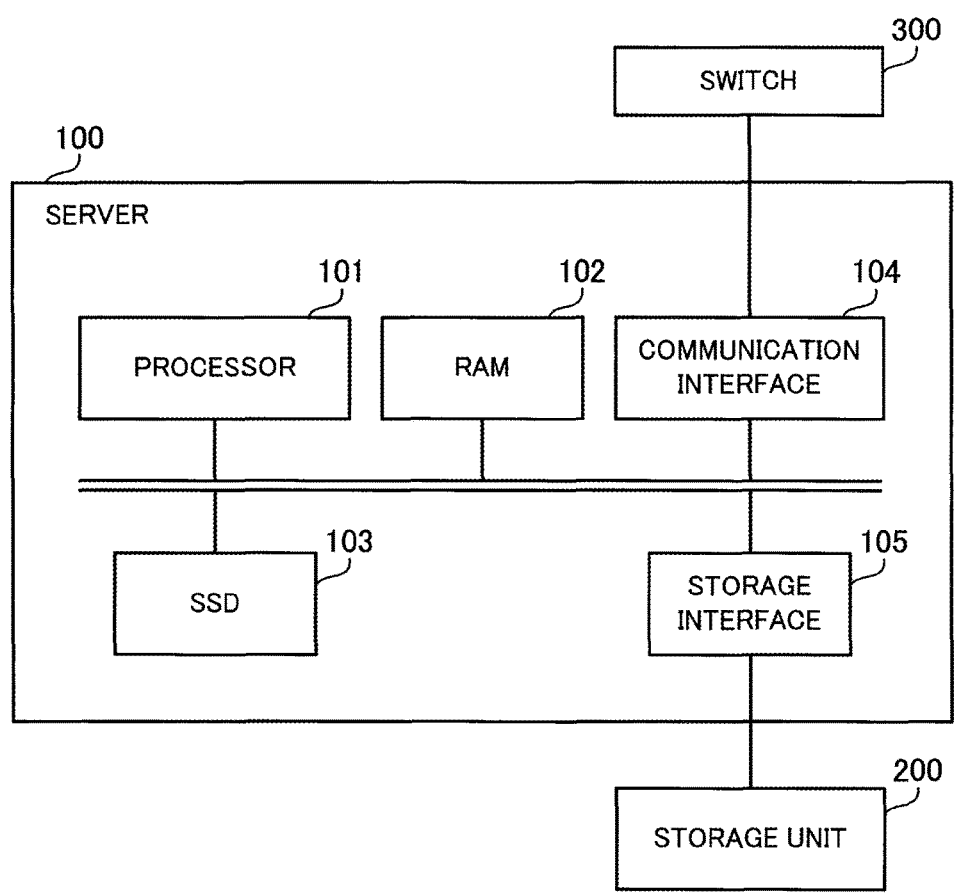
FIG. 3 illustrates an example of a hardware configuration of a server.

FIG. 3 illustrates an example of a hardware configuration of a server. The server 100 is implemented, for example, as a computer illustrated in FIG. 3. The server 100 includes a processor 101, random access memory (RAM) 102, a SSD 103, a communication interface 104, and a storage interface 105. The processor 101 exercises overall control over processing of the server 100. The processor 101 is, for example, a central processing unit (CPU), a digital signal processor (DSP), an application specific integrated circuit (ASIC), a field programmable gate array (FPGA), or a combination of two or more of these.

The RAM 102 is used as a main storage device of the server 100. The RAM 102 temporarily stores at least part of an operating system (OS) program and application programs to be executed by the processor 101. The RAM 102 also temporarily stores therein various types of data to be used by the processor 101 for its processing. The SSD 103 is used as a secondary storage device of the server 100. The SSD 103 stores therein the OS program, application programs, and various types of data. Note that a hard disk drive (HDD) may be used as a secondary storage device in place of the SSD 103.

The communication interface 104 is an interface circuit for communicating with different devices via the switch 300. The storage interface 105 is an interface circuit for communicating with storage devices housed in the storage unit 200. Note that the storage interface 105 and the storage devices in the storage unit 200 communicate with each other using a communication protocol, such as SAS (Serial-Attached SCSI (Small Computer System Interface)) and Fibre Channel (FC). With the above-described configuration, processing functions of the server 100, i.e., processing functions of each of the servers 100a to 100c, are implemented. Note that each of the host devices 400a and 400b may also be implemented as a computer, such as the one illustrated in FIG. 3.

Figure 4:
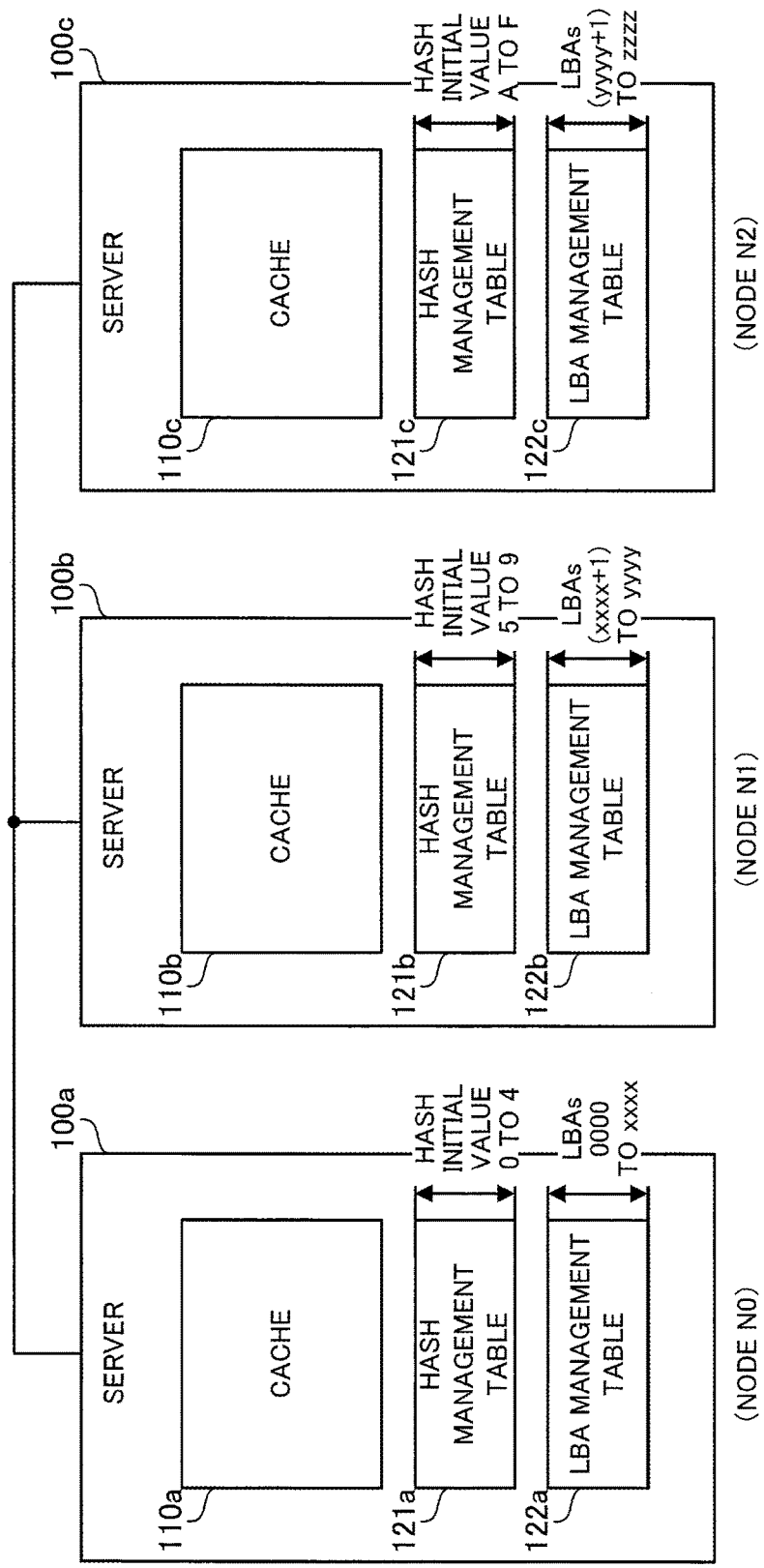
FIG. 4 illustrates caches and main table information provided in individual servers.

Next described is a storage control method employed by the servers 100a to 100c. FIG. 4 illustrates caches and main table information provided in individual servers. For ease of explanation, the servers 100a to 100c provide the host device 400 with a single logical volume created over physical storage resources of the storage units 200a to 200c. The area of the cache 110a is allocated within the RAM 102 of the server 100a. Similarly, the area of the cache 110b is allocated within the RAM 102 of the server 100b, and the area of the cache 110c is allocated within the RAM 102 of the server 100c. In the caches 110a to 110c, data of the logical volume is temporarily stored in order to increase the response speed of data read from storage areas of the storage units 200a to 200c corresponding to the logical volume.

In addition, according to the storage system of this embodiment, "deduplication" is performed to avoid data with identical content included in the logical volume from being redundantly stored in the storage areas. In deduplication, a write-data hash value (fingerprint) is calculated for each block of the logical volume and used to avoid data with the same hash value from being redundantly stored. Note that deduplication takes place not when data is written to the storage units 200a to 200c but when it is written to the caches 110a to 110c, as described later.

Further, the storage system manages data in a distributed manner across the storage nodes N0 to N2 using hash values as keys. In the example of FIG. 4, data is managed in a distributed manner by the following method based on hash initial values. Note that the term "hash initial value" below refers to the most significant digit of each hash value in hexadecimal format. The storage node N0 is in charge of managing data whose hash initial value is 0 to 4. The storage unit 200a in the storage node N0 stores therein only data whose hash value starts with one of 0 to 4, and the server 100a of the storage node N0 holds a hash management table 121a in which hash values starting with 0 to 4 are mapped to storage locations of the corresponding data.

The storage node N1 is in charge of managing data whose hash initial value is 5 to 9. The storage unit 200b in the storage node N1 stores therein only data whose hash value starts with one of 5 to 9, and the server 100b of the storage node N1 holds a hash management table 121b in which hash values starting with 5 to 9 are mapped to storage locations of the corresponding data. The storage node N2 is in charge of managing data whose hash initial value is A to F. The storage unit 200c in the storage node N2 stores therein only data whose hash value starts with one of A to F, and the server 100c of the storage node N2 holds a hash management table 121c in which hash values starting with A to F are mapped to storage locations of the corresponding data.

Such distribution management allows data in the logical volume to be evenly distributed and stored across the storage units 200a to 200c. In addition, even if write frequency varies from block to block in the logical volume, write accesses are almost evenly distributed across the storage units 200a to 200c regardless of the imbalance in the write frequencies. As a result, the maximum number of writes on each of the storage units 200a to 200c decreases. Further, because data with identical content is not written to the storage units 200a to 200c due to deduplication, the number of writes on each of the storage units 200a to 200c is further reduced. It is known that the performance of SSDs degrades with an increase in the number of writes. In the case where SSDs are used as storage devices of the storage units 200a to 200c, the distribution management above contributes to preventing degradation of the performance of the SSDs and extending their life.

Apart from the above-described distribution management based on hash values, mappings between individual blocks in the logical volume and the physical storage areas are managed in the following manner. Each of the servers 100a to 100c is assigned, out of the area of the logical volume, an area for managing mappings between blocks and physical storage areas. Note that each block of the logical volume is assigned an LBA from 0000 to zzzz. In the example of FIG. 4, the server 100a manages mappings between individual blocks at LBAs 0000 to xxxx and physical storage areas, and holds an LBA management table 122a for the mappings. The server 100b manages mappings between individual blocks at LBAs (xxxx+1) to yyyy and physical storage areas, and holds an LBA management table 122b for the mappings (N.B. xxxx<yyyy). The server 100c manages mappings between individual blocks at LBAs (yyyy+1) to zzzz and physical storage areas, and holds an LBA management table 122c for the mappings (N.B. yyyy<zzzz).

Note that the mappings between individual blocks and physical storage areas may be managed in the following manner. For example, the logical volume is divided into stripes of a fixed size (this technique is called "striping") and the stripes, starting with the first stripe, are assigned one at a time to the servers 100a to 100c in the stated order (i.e., the servers 100a→100b→100c→100a→100b and so on). Then, each of the servers 100a to 100c manages mappings between blocks in the assigned stripes and physical storage areas.

Next described are examples of data structures of the hash management tables 121a to 121c and the LBA management tables 122a to 122c. Note that the term "hash management table 121" may be used in the following description when no distinction is made among the hash management tables 121a to 121c. Similarly, the term "LBA management table 122" may be used when no distinction is made among the LBA management tables 122a to 122c.

Figure 5:
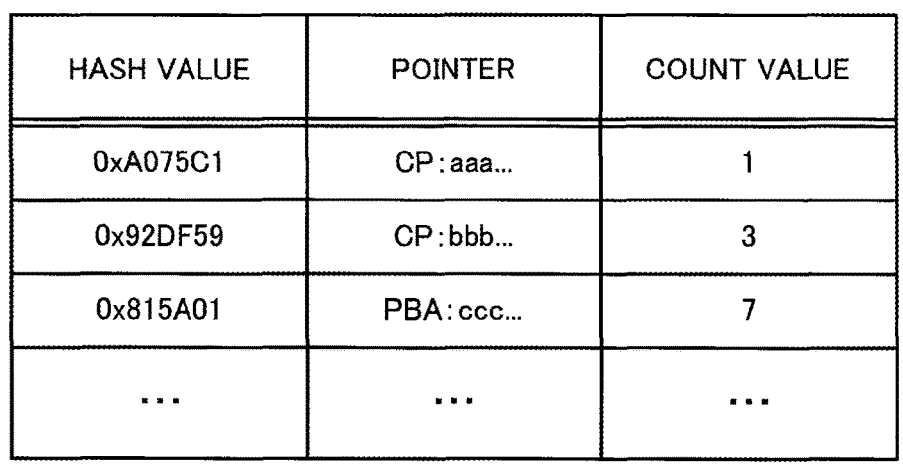
FIG. 5 illustrates a data structure example of a hash management table.

FIG. 5 illustrates a data structure example of a hash management table. The hash management table 121 includes the following items: hash value; pointer; and count value. Each field under the item "hash value" contains the hash value calculated based on data of each block. Each field under the item "pointer" contains the pointer indicating a storage location of the corresponding data. If the corresponding data is present in a cache, the field contains the page number of a cache page that holds the corresponding data. If the corresponding data is present in a storage unit, the field contains the address (physical block address, or PBA) in the storage unit, where the corresponding data is stored. In FIG. 5, "CP:" indicates that its subsequent string represents a cache page number while "PBA:" indicates that its subsequent string represents a PBA. Each field under the item "count value" contains the value indicating how many LBAs are associated with the storage location referenced by the corresponding pointer, in other words, the value indicating how many times the data corresponding to the hash value has appeared repeatedly.

Figure 6:
FIG. 6 illustrates a data structure example of a logical block address (LBA) management table.

FIG. 6 illustrates a data structure example of an LBA management table. The LBA management table 122 includes items of LBA and pointer. Each field under the item "LBA" contains the LBA indicating a block in the logical volume. Each field under the item "pointer" contains the address indicating an entry in the hash management table 121 in the case where a hash value of the corresponding data has already been calculated, and contains the page number of a cache page that holds the corresponding data in the case where a hash value of the corresponding data has yet to be calculated. In FIG. 6, "EN:" indicates that its subsequent string represents the address of an entry while "CP:" indicates that its subsequent string represents a cache page number.

Next described are basic write control processes in the storage system with reference to FIGS. 7 to 10. In the storage system, deduplication takes place not when data is written to the storage units 200a to 200c but when it is written to the caches 110a to 110c, as described above. In addition, "inline" and "postprocess" are selectively employed in the deduplication. With inline deduplication, deduplication is completed before returning a response to a write request received from the host device 400. On the other hand, with postprocess deduplication, the deduplication process occurs in the background after returning a response to a write request received from the host device 400. In the following description, the term "inline mode" refers to a write control mode using inline deduplication while the term "postprocess mode" refers to a write control mode using postprocess deduplication.

Figure 7:
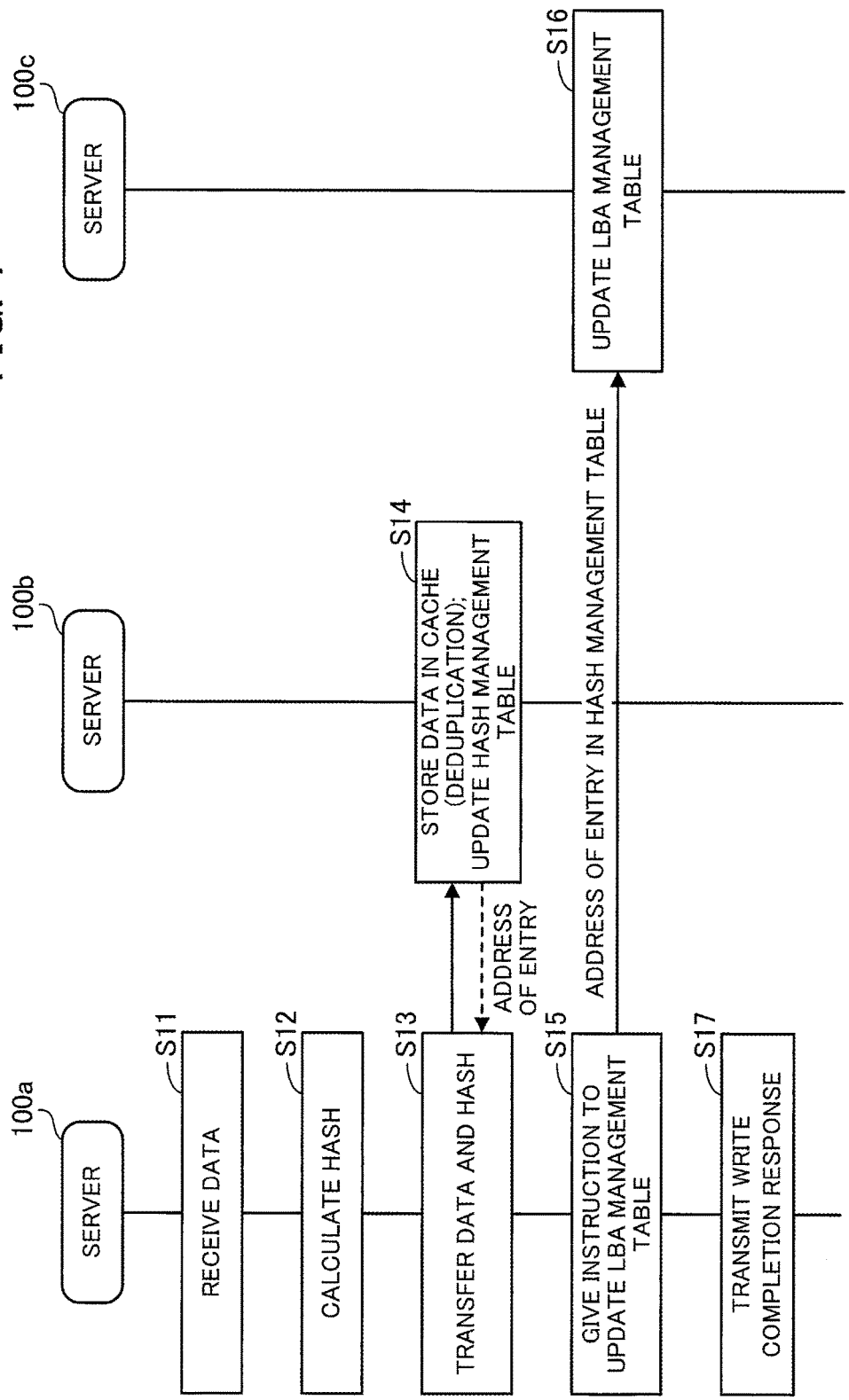
FIG. 7 is a sequence diagram illustrating a basic procedure of an inline-mode write control process.

FIG. 7 is a sequence diagram illustrating a basic procedure of an inline-mode write control process. Note that FIG. 7 illustrates an example where the server 100a receives a data write request from the host device 400.

[Step S11] The server 100a receives data and a write request that designates an LBA in the logical volume as a write destination of the data.

[Step S12] The server 100a calculates a hash value of the received data.

[Step S13] Based on the hash initial value of the calculated hash value, the server 100a identifies a server in charge of managing the data corresponding to the hash value. Note that a server in charge of managing data corresponding to a hash value may sometimes be referred to as "server in charge of the hash value" for short in the following description. Assume in the example of FIG. 7 that the server 100b is identified as the server in charge of the calculated hash value. In this case, the server 100a transfers the data and the hash value to the server 100b, and instructs the server 100b to write the data.

[Step S14] The server 100b determines whether the received hash value is already registered in the hash management table 121b.

If the received hash value is not registered in the hash management table 121b, the server 100b creates a new cache page in the cache 110b and stores the received data on the cache page. The server 100b also creates a new entry in the hash management table 121b and then registers, in the entry, the received hash value, the page number of the created cache page, and "1" under the item "count value". Subsequently, the server 100b transmits the address of the created entry to the server 100a.

On the other hand, if the received hash value is already registered in the hash management table 121b, the data requested to be written is already stored in the cache 110b or the storage unit 200b. In this case, the server 100b increases the count value in an entry registering the hash value by 1, and transmits the address of the entry to the server 100a. Note that the received data is discarded.

[Step S15] Based on the LBA designated as the write destination, the server 100a identifies a server in charge of a mapping between the LBA and a physical storage area. Note that a server in charge of the mapping between an LBA and a physical storage area may sometimes be referred to as "server in charge of the LBA" for short in the following description. Assume in the example of FIG. 7 that the server 100c is identified as the server in charge of the designated LBA. In this case, the server 100a transmits, to the server 100c, the address of the entry transmitted from the server 100b in step S14 and the LBA designated as the write destination, and instructs the server 100c to update the LBA management table 122c.

[Step S16] The server 100c registers the received address of the entry, within the LBA management table 122c, in an entry registering the received LBA, under the item "pointer". Herewith, a block indicated by the LBA and a physical storage area are associated with each other.

[Step S17] Upon receiving table update completion notification from the server 100c, the server 100a transmits a response message indicating the completion of the data write to the host device 400.

Figure 8:
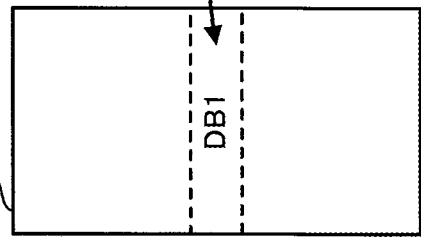
FIG. 8 illustrates an example of an inline-mode table update process.

As described above, in the inline mode, data requested to be written is deduplicated and then stored in one of the servers 100a to 100c before returning a response to the host device 400. FIG. 8 illustrates an example of an inline-mode table update process. Assume in FIG. 8 that a request for data write to a data block DB1 corresponding to an LBA 0001 is issued in the process of FIG. 7. Assume also that a hash value "0x92DF59" is calculated based on the data block DB1 (note that the prefix "0x" denotes a hexadecimal value).

In this case, in step S14, the data block DB1 is stored in the cache 110b of the server 100b. In addition, as for an entry 121b1 in the hash management table 121b held by the server 100b, information pointing to a cache page where the data block DB1 is stored is registered in a field under the item "pointer", corresponding to the hash value "0x92DF59". Note that, if a data block with identical content to that of the data block DB1 is already registered in the cache 110b, the entry 121b1 including the above-described information is already registered in the hash management table 121b. In step S16, within the LBA management table 122c held by the server 100c, information pointing to the entry 121b1 in the hash management table 121b is registered in a field under the item "pointer", corresponding to the LBA 0001.

Figure 9:
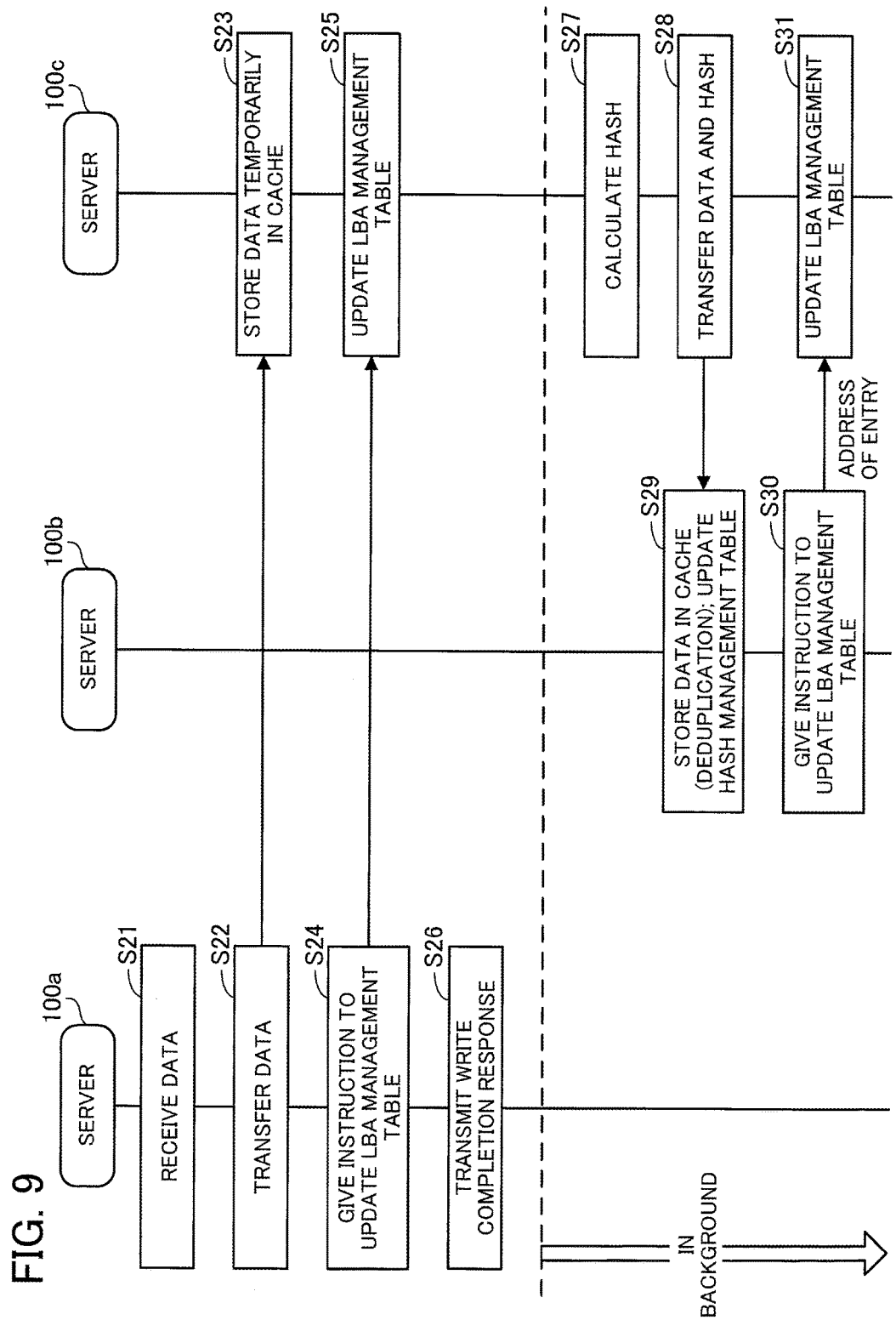
FIG. 9 is a sequence diagram illustrating a basic procedure of a postprocess-mode write control process.

FIG. 9 is a sequence diagram illustrating a basic procedure of a postprocess-mode write control process. Note that, as with FIG. 7, FIG. 9 illustrates an example where, in an initial state, the server 100a receives a data write request from the host device 400.

[Step S21] The server 100a receives data and a write request that designates an LBA in the logical volume as a write destination of the data.

[Step S22] Based on the LBA designated as the write destination, the server 100a identifies a server in charge of managing a mapping between the write destination block and a physical storage area. Assume in the example of FIG. 9 that the server 100c is identified as the server in charge of the designated LBA. In this case, the server 100a transmits the data requested to be written to the server 100c, and instructs the server 100c to store the data in the cache 110c.

[Step S23] The server 100c creates a new cache page in the cache 110c and then stores the received data on the cache page. The data is stored in the cache 110c as data of a "hash uncalculated block", i.e., data of a block for which a hash value is yet to be calculated. The server 100c also transmits the page number of the created cache page to the server 100a.

[Step S24] The server 100a transmits, to the server 100c, the received page number and the LBA designated as the write destination, and instructs the server 100c to update the LBA management table 122c.

[Step S25] The server 100c registers the received page number, within the LBA management table 122c, in an entry registering the received LBA, under the item "pointer".

Note that the LBA designated as the write destination may be transferred with the data in step S22. In this case, the server 100a need not communicate with the server 100c in step S24.

[Step S26] Upon receiving table update completion notification from the server 100c, the server 100a transmits a response message indicating the completion of the data write to the host device 400.

[Step S27] The server 100c calculates a hash value of the data stored in the cache 110c in step S23 at a later time, i.e., asynchronously, after step S26.

[Step S28] Based on the hash initial value of the calculated hash value, the server 100c identifies a server in charge of managing the data corresponding to the hash value. Assume in the example of FIG. 9 that the server 100b is identified as the server in charge of the calculated hash value. In this case, the server 100c transfers the data and the hash value to the server 100b, and instructs the server 100b to write the data. In this regard, the cache page on which the data has been stored is released.

[Step S29] The server 100b determines whether the received hash value is already registered in the hash management table 121b, and then performs data storage and table update processing according to the result of the determination. The process of step S29 is the same as that of step S14 of FIG. 7.

[Step S30] The server 100b transmits, to the server 100c, the address of an entry in the hash management table 121b, in which the received hash value is registered, and instructs the server 100c to update the LBA management table 122c.

[Step S31] The server 100c registers the received address of the entry, within the LBA management table 122c, in an entry registering the LBA of the data for which the hash value is calculated in step S27, under the item "pointer". In the field of the entry under the item "pointer", a cache page number having been registered is updated with the received address of the entry.

As described above, in the postprocess mode, data requested by the host device 400 to be written is temporarily stored in the cache 110c of the server 100c in charge of managing its write destination LBA without checking to see whether the data already exists elsewhere. Then, when the data storage is completed and the update of the LBA management table 122c associated with the storage is then completed, a response message is transmitted to the host device 400. Thus, the postprocess mode has a shorter response time (latency) to the host device 400 compared to the inline mode because no deduplication process takes place before the response is returned.

Figure 10:
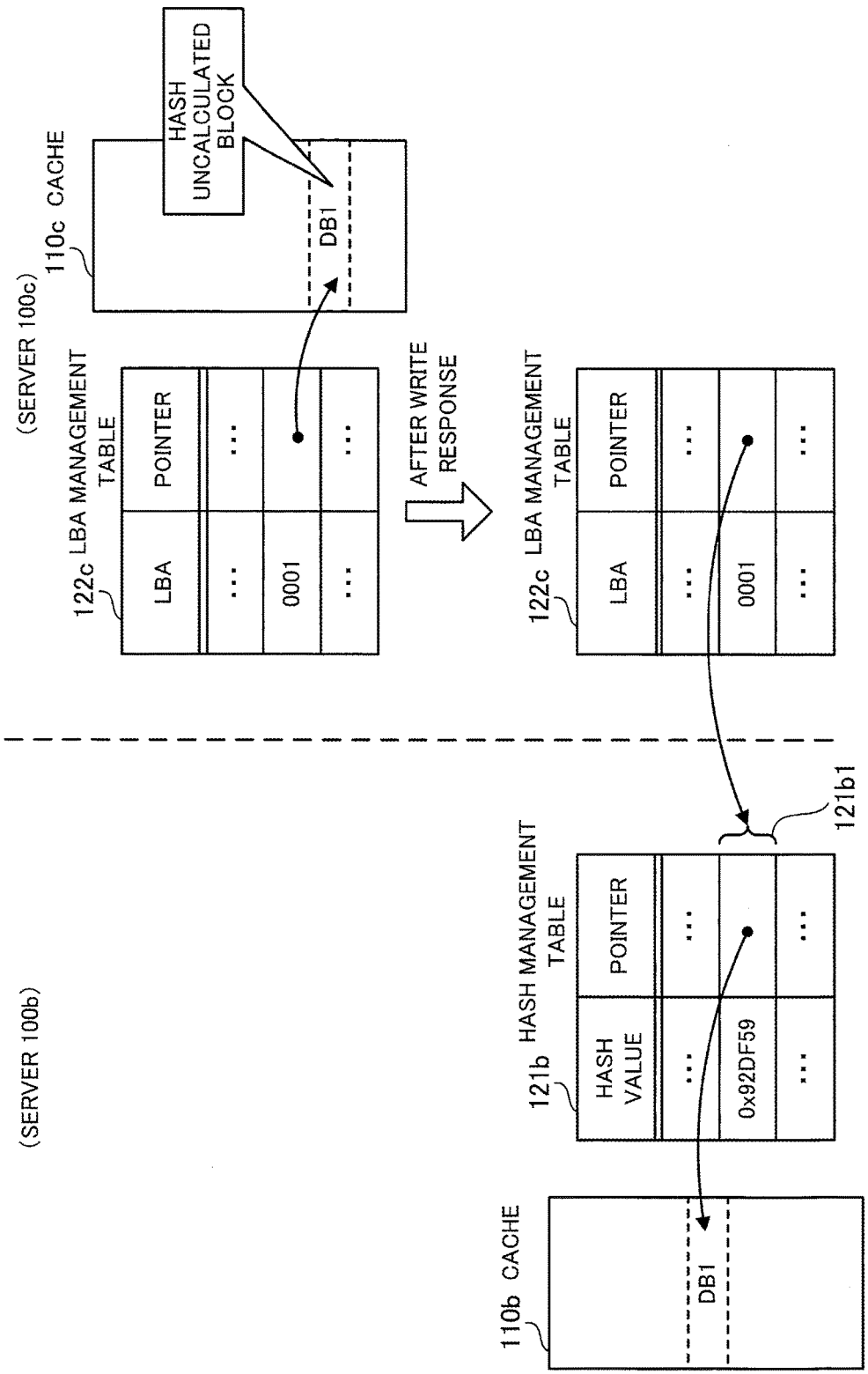
FIG. 10 illustrates an example of a postprocess-mode table update process.

FIG. 10 illustrates an example of a postprocess-mode table update process. Assume in FIG. 10 that a request for data write to the data block DB1 corresponding to the LBA 0001 is issued in the process of FIG. 9. Assume also that the hash value "0x92DF59" is calculated based on the data block DB1. In this case, prior to returning the response to the host device 400, the data block DB1 is stored in the cache 110c of the server 100c in step S23. In addition, in step S25, information pointing to the data storage location in the cache 110c is registered in the LBA management table 122c held by the server 100c, in association with the LBA 0001.

In step S28 after the response to the host device 400 is made, the data block DB1 is transferred to the server 100b and, in response, the deduplication process is performed. In step S29, the data block DB1 is stored in the cache 110b of the server 100b. In addition, as for the entry 121b1 within the hash management table 121b held by the server 100b, information pointing to a cache page where the data block DB1 is stored is registered in a field under the item "pointer", corresponding to the hash value "0x92DF59". Note that, if a data block with identical content to that of the data block DB1 is already registered in the cache 110b, the entry 121b1 including the above-described information is already registered in the hash management table 121b. In step S31, within the LBA management table 122c held by the server 100c, information pointing to the entry 121b1 of the hash management table 121b is registered in a field under the item "pointer", corresponding to the LBA 0001.

Figure 11:
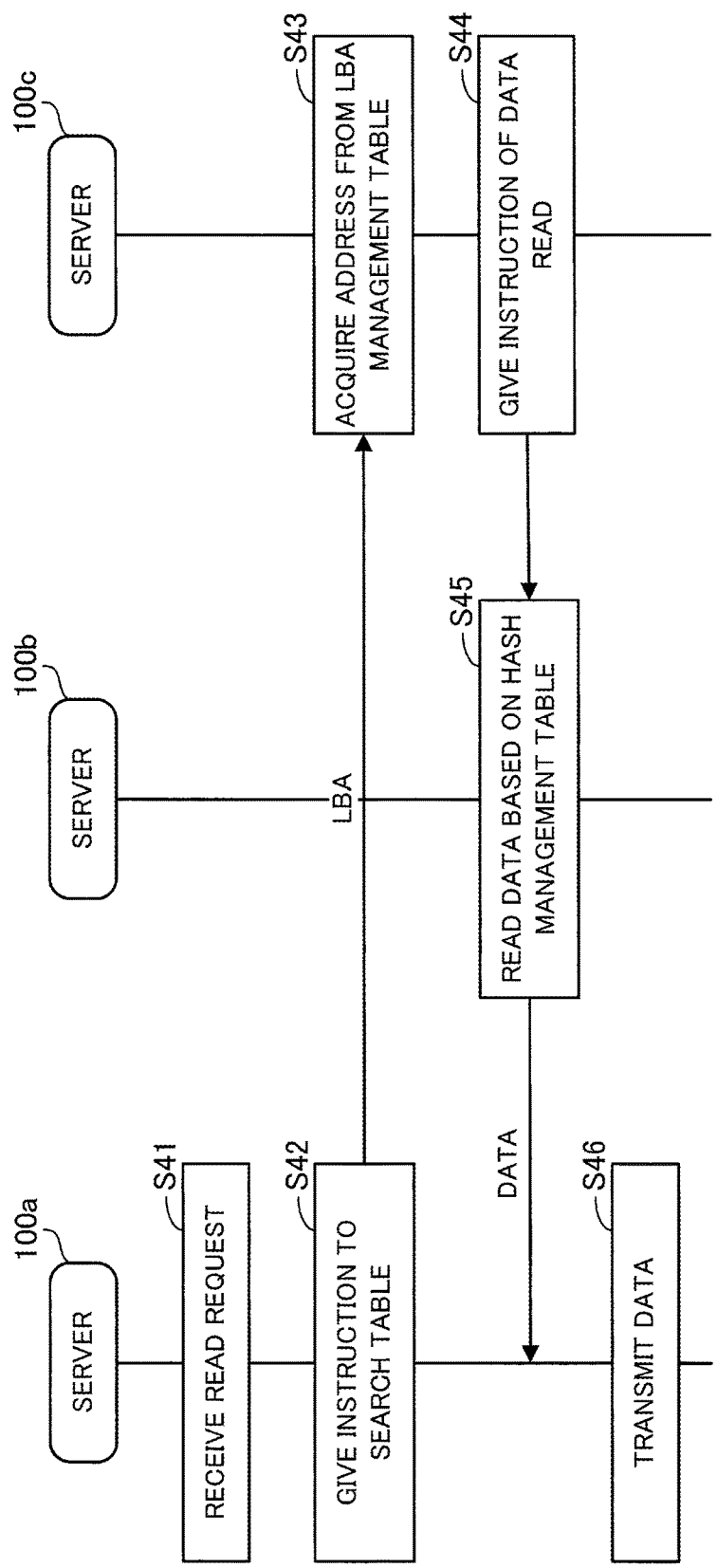
FIG. 11 is a sequence diagram illustrating a procedure of a read control process in the storage system.

FIG. 11 is a sequence diagram illustrating a procedure of a read control process in the storage system. Assume in FIG. 11 that the host device 400 requests the server 100a to read data from the LBA 0001.

[Step S41] The server 100a receives, from the host device 400, a request of reading data from the LBA 0001.

[Step S42] Based on the LBA designated as the read source, the server 100a identifies a server in charge of managing a mapping between the read source block and a physical storage area. In the example of FIG. 11, the server 100c is identified as the server in charge of the designated LBA. In this case, the server 100a transmits the LBA to the server 100c, and instructs the server 100c to search the LBA management table 122c.

[Step S43] The server 100c identifies, within the LBA management table 122c, an entry including the received LBA, and acquires, from the identified entry, information registered under the item "pointer". Assume here that the address of an entry in the hash management table 121b of the server 100b is acquired from the field under the item "pointer" in the identified entry.

[Step S44] The server 100c transmits the acquired address of the entry to the server 100b, and then instructs the server 100b to read data from the corresponding storage area for the server 100a.

[Step S45] The server 100b refers, within the hash management table 121b, to an entry indicated by the received address and reads information, within the entry, registered under the item "pointer". Assume that the address of a cache page is read here. The server 100b reads data from the cache page of the cache 110b, indicated by the read address and transmits the read data to the server 100a.

[Step S46] The server 100a transmits the data received from the server 100b to the host device 400.

As described above, data requested to be read is transmitted to the server 100a based on the hash management table 121 and the LBA management table 122. Note that, in step S43, the page number of a cache page in the cache 110c of the server 100c may be acquired from the field under the item "pointer" within the LBA management table 122c. This occurs when a hash value has yet to be calculated for the data requested to be read. In this case, the server 100c reads data from the appropriate cache page of the cache 110c and transmits the data to the server 100a. Then, the server 100a transmits the data received from the server 100c to the host device 400.

The postprocess mode has a shorter response time to a write request compared to the inline mode because the deduplication process takes place at a later time, as illustrated in FIG. 9. However, there is also a downside to the postprocess mode that the number of requests that may be processed per unit time (i.e., input/output per second, or IOPS) may drop due to processing load imposed by the asynchronous and deferred deduplication process. Specifically, in the postprocess mode, the deduplication process including hash value calculation is carried out in the background after a response to the host device 400 is made. For this reason, load imposed by the background processing of the individual servers may become a factor of degrading their performance of IO responses to the host device 400.

In addition, in the background processing, if a server for storing data temporarily in its cache is different from a server in charge of managing the data, which is identified from a hash value of the data, as in the example of FIG. 9, communication between these servers takes place. This communication involves not only transmission of instructions, such as a table update instruction, and responses to the instructions but also transfer of substantive write data (see step S28 of FIG. 9).

In both the inline mode and the postprocess mode, communication between servers may take place between the reception of a write request from the host device 400 and the transmission of a response to the write request, as in the examples of FIGS. 7 and 9. In addition, in the case where a read request is received from the host device 400, communication between servers may take place before a response to the read request is made to the host device 400, as in the example of FIG. 11. Therefore, if communication traffic between the servers becomes congested due to the above-described communication associated with the background processing, the servers may suffer from degradation of performance of IO responses to the host device 400. For example, there is an upper limit to the number of messages transmittable per unit time in server-to-server communication. Therefore, an increase in the number of communications between servers decreases the number of IO requests from the host device 400 to be processed per unit time (i.e., the IOPS of the server 100 seen from the host device 400).

In view of the above-described problems, the server 100 of this embodiment performs the inline-mode and postprocess-mode write control processes selectively. In this regard, the server 100 restricts the number of times to apply the postprocess mode to a minimum to thereby control an increase in processing and communication load, which in turn reduces a decrease in IOPS. Specifically, in the case of sequentially receiving almost the same number of write commands directed to the same logical volume from the same source, the server 100 identifies these commands as "sequential command groups". When detecting a write pattern in which sequential command groups are issued at almost the same intervals, the server 100 determines, with respect to each sequential command group, whether to employ the inline mode for which write commands and the postprocess mode for which write commands. Such a write pattern may occur, for example, when an application involving transaction processing is running on the host device 400.

FIG. 12 illustrates responses to sequential command groups. FIG. 12 depicts Response Examples 1 to 4 associated with responses to sequential command groups, with Response Example 4 representing responses according to this embodiment while Response Examples 1 to 3 being presented as examples compared with this embodiment. Assume in the example of FIG. 12 that the host device 400 performs processing that involves transmitting six write commands sequentially, receiving responses to all these commands, and then transmitting next six write commands sequentially. Assume, for example, that the write destination of these write commands is the same logical volume. The server 100 identifies such successive six write commands as a sequential command group, and detects the occurrence of a specific write pattern in the case of receiving sequential command groups at almost constant intervals. FIG. 12 illustrates sequential command groups 51 and 52 included in a detected write pattern.

Note that the detection of a write pattern is made not only when the host device 400 has issued a sequential command group immediately after receiving all response commands corresponding to a preceding sequential command group. Such a detection is also made, for example, when the host device 400 has executed a predetermined internal process after receiving all response commands corresponding to a preceding sequential command group and has subsequently issued the next sequential command group.

Response Example 1 illustrates a case where the inline mode is employed for all write commands. In Response Example 1, upon receiving a response command 76 corresponding to the last write command 66 of the sequential command group 51, the host device 400 starts transmission of the next sequential command group 52. Assume that, in the inline mode, it takes a response time t1 from the reception of a write command to the transmission of a corresponding response command. As described above, the inline mode has a longer response time after the reception of a write request. For this reason, in Response Example 1, it takes a long time before the host device 400 issues the next sequential command group 52. That is, the interval of issuing sequential command groups becomes large. Therefore, in the case where an application program involving transaction processing is running on the host device 400, the program has a long execution time, which results in a decrease in processing efficiency of the host device 400. Note that such a decrease in processing efficiency of the host device 400 is hereinafter referred to as a "reduction in throughput of the host device 400".

Response Examples 2 to 4 employ the postprocess mode for some write commands included in a sequential command group for the purpose of shortening the response time. First, Response Example 2 illustrates a case where the postprocess mode is employed for intermediate write commands 63 and 64 among write commands included in the sequential command group 51. A response time t2 taken in the postprocess mode from the reception of a write command to the transmission of a corresponding response command is shorter than the response time t1 in the inline mode. However, as in Response Example 2, even if the response times to the intermediate write commands 63 and 64 are shortened, the transmission of the response command 76 corresponding to the last write command 66 occurs at the same time as in Response Example 1. Thus, employing the postprocess mode for only the intermediate write commands has no contribution to shortening the overall response time to the sequential command group. That is, in order to shorten the overall response time to the sequential command group, the postprocess mode needs to be applied to write commands in the back among the write commands included in the sequential command group.

Response Example 3 illustrates a case where the postprocess mode is employed for the last three write commands 64 to 66 among the write commands included in the sequential command group 51. In this case, the transmission times of response commands 74 to 76 corresponding to the write commands 64 to 66, respectively, come earlier. As a result, the time for the host device 400 to finish receiving all the response commands corresponding to the sequential command group 51 is shortened by a time t3 compared to Response Examples 1 and 2. However, if the inline mode is employed for the write command 64, a transmission time T1 of a response command corresponding to the write command 64 does not come later than a transmission time T2 of the response command 76 corresponding to the last write command 66. Therefore, employing the postprocess mode for the write command 64 makes no contribution to a reduction in the overall response time to the sequential command group 51 and results in an undesirable increase in processing load.

In view of this, according to this embodiment, the server 100 employs the postprocess mode only for the write commands 65 and 66 while employing the inline mode for the remaining write commands, as illustrated in Response Example 4. Herewith, the postprocess mode is applied only to minimum write commands that contribute to a reduction in the overall response time to the sequential command group 51. Therefore, it is possible to shorten the overall response time to the sequential command group 51 while controlling an increase in processing load on the server 100, which in turn improves the throughput of the host device 400.

Note that the number of write commands to which the postprocess mode is applied is referred to as the "number of applications" and denoted by N. In addition, within the sequential command group, a group of write commands to which the inline mode is applied is referred to as the "front side command group" and a group of write commands to which the postprocess mode is applied is referred to as the "backside command group". According to Response Example 4, the server 100 sets the number of applications N in such a manner that a transmission time T3 of the response command 74 corresponding to the last write command 64 included in the front side command group falls on or before, but closest to, a transmission time T4 of the response command 76 corresponding to the last write command 66 included in the backside command group.

Specifically, the number of applications N is calculated by the following Equation (1) using a minimum transmission time interval tr allowed between sequential write commands transmitted from the host device 400, the response time t1 in the inline mode, and the response time t2 in the postprocess mode. Note that the value obtained by Equation (1) is rounded down to the closest whole number.

$$N=(t1-t2)/tr \quad (1).$$

In Response Example 4, N=2. Note that the time interval tr may be given as a performance specification of the host device 400. The response times t1 and t2 may be given as performance specifications of the server 100. Therefore, the time interval tr and the response times t1 and t2 may be stored in advance in a storage device of the server 100 and retrieved when the number of applications N is calculated. Alternatively, the number of applications N may be calculated in advance using the given time interval tr and response times t1 and t2 and then stored in the storage device of the server 100. In this case, the server 100 need not carry out a calculation to obtain the number of applications N and simply retrieves it from the storage device. In addition, as for the time interval tr and the response times t1 and t2, the server 100 may calculate at least one of them based on a write command reception history and a response command transmission history accumulated in the server 100 and then store the calculated value in the storage device.

Figure 13:
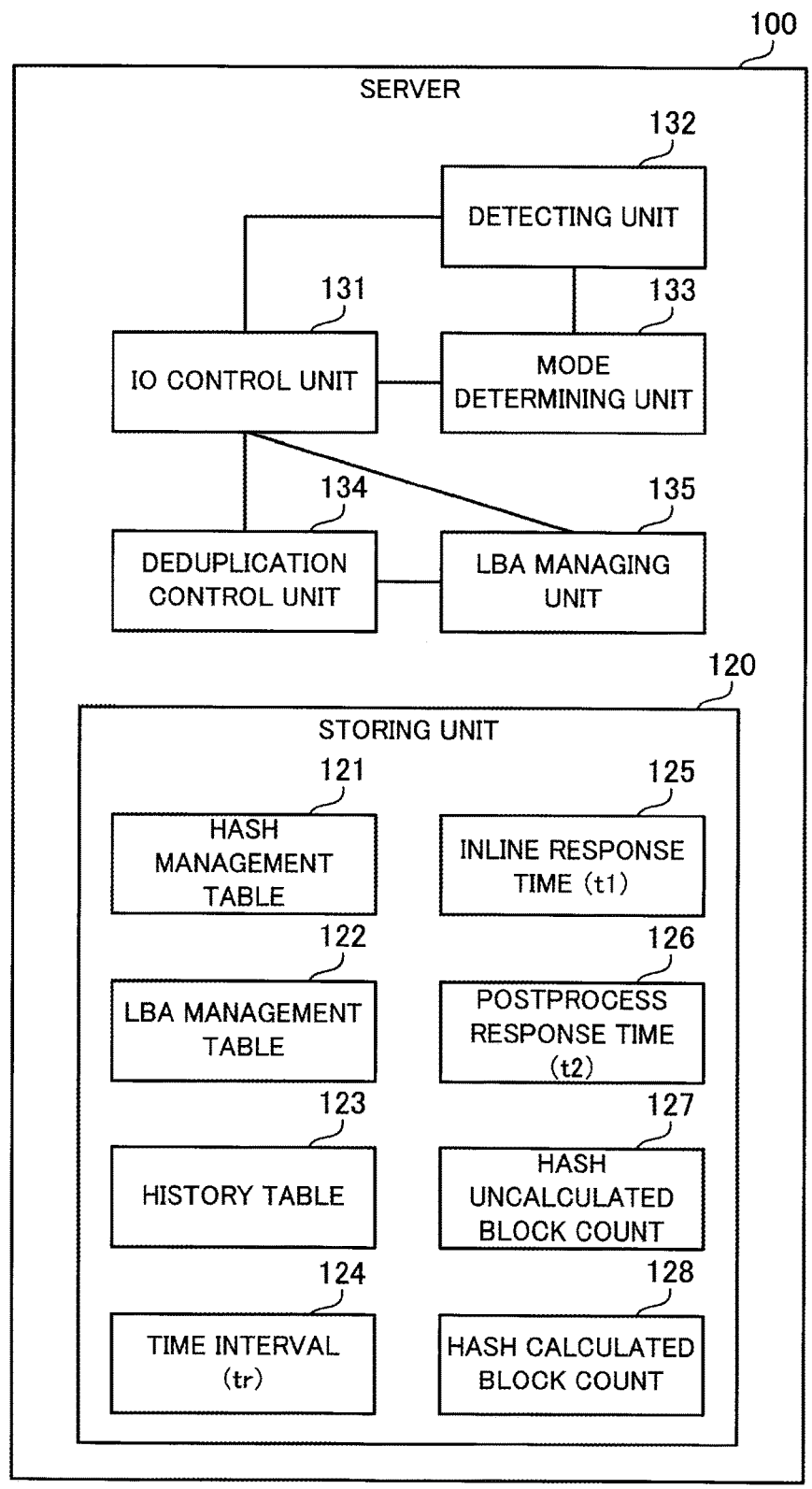
FIG. 13 is a block diagram illustrating a configuration example of processing functions of the server.

Next described are details of processing performed by the server 100. FIG. 13 is a block diagram illustrating a configuration example of processing functions of a server. The server 100 includes a storing unit 120, an IO control unit 131, a detecting unit 132, a mode determining unit 133, a deduplication control unit 134, and an LBA managing unit 135. The storing unit 120 is implemented using a storage area secured in a storage device of the server 100, for example, the RAM 102 or the SSD 103. The storing unit 120 stores therein the above-described hash management table 121 and LBA management table 122. Further, the storing unit 120 includes therein a history table 123, a time interval 124, an inline response time 125, a postprocess response time 126, a hash uncalculated block count 127, and a hash calculated block count 128.

The history table 123 holds information associated with detected sequential command groups. The history table 123 is used in detecting a write pattern and determining whether to apply the postprocess mode. Note that the history table 123 is created for each write pattern detection candidate. The time interval 124 indicates a minimum transmission time interval ("tr" described above) allowed between sequential write commands transmitted from the host device 400. The time interval 124 may be recorded for each host device 400. The inline response time 125 indicates a time taken in the inline mode from the reception of each write command from the host device 400 to the transmission of a corresponding response to the host device 400 ("t1" described above). The postprocess response time 126 indicates a time taken in the postprocess mode from the reception of each write command from the host device 400 to the transmission of a corresponding response to the host device 400 ("t2" described above).

The hash uncalculated block count 127 is a count value obtained by counting the number of hash uncalculated blocks amongst data blocks stored in the cache 110 of the server 100. The hash uncalculated blocks are data blocks that are, in the postprocess-mode write control process, stored in the cache 110 of a server in charge of an LBA designated by the host device 400 as the write destination without calculation of hash values. On the other hand, the hash calculated block count 128 is a count value obtained by counting the number of hash calculated blocks amongst the data blocks stored in the cache 110 of the server 100. The hash calculated blocks are data blocks for each of which a hash value is calculated and which are then stored in the cache 110 of a server in charge of the calculated hash value.

Processing of the IO control unit 131, the detecting unit 132, the mode determining unit 133, the deduplication control unit 134, and the LBA managing unit 135 are implemented, for example, by the processor 101 of the server 100 executing a predetermined program. The IO control unit 131 exercises overall control of processing, from the reception of IO commands from the host device 400 to the transmission of responses to the received IO commands. Upon receiving a write command from the host device 400, the IO control unit 131 selects a write control mode determined by the mode determining unit 133 between the inline mode and the postprocess mode.

In the case of selecting the inline mode, the IO control unit 131 calculates a hash value of the write data and identifies a server in charge of the calculated hash value. The IO control unit 131 passes the write data and the hash value on to the deduplication control unit 134 of the identified server in charge, and instructs the deduplication control unit 134 to store the write data and update the hash management table 121. Further, the IO control unit 131 identifies a server in charge of an LBA designated as the write destination. The IO control unit 131 instructs the LBA managing unit 135 of the identified server in charge to update the LBA management table 122.

On the other hand, in the case of selecting the postprocess mode, the IO control unit 131 identifies a server in charge of an LBA designated as the write destination. The IO control unit 131 passes the write data on to the LBA managing unit 135 of the identified server in charge, and instructs the LBA managing unit 135 to store the write data and update the LBA management table 122.

The detecting unit 132 monitors write commands for each pair of a source and a write destination logical volume, and detects, based on the monitoring results, a write pattern corresponding to write commands issued from the same source and directed to the same logical volume. The mode determining unit 133 determines whether to employ the postprocess mode for which write commands amongst write commands included in a sequential command group belonging to the detected write pattern. The mode determining unit 133 also determines whether to employ the inline mode for which write commands amongst the write commands included in the sequential command group. Upon receiving write data and a hash value, the deduplication control unit 134 stores the write data in cache 110 in such a manner so as to eliminate data with duplicate content, and updates the hash management table 121. In the inline-mode write control process, the deduplication control unit 134 receives write data and a hash value from the IO control unit 131 of one server 100. On the other hand, in the postprocess-mode write control process, the deduplication control unit 134 receives write data and a hash value from the LBA managing unit 135 of one server 100, and instructs the LBA managing unit 135 to update the LBA management table 122.

In the inline-mode write control process, the LBA managing unit 135 updates the LBA management table 122 according to an instruction from the IO control unit 131. On the other hand, in the postprocess-mode write control process, the LBA managing unit 135 stores write data in cache 110 as data of a hash uncalculated block and updates the LBA management table 122 according to an instruction from the IO control unit 131. Further, the LBA managing unit 135 sequentially selects data of a hash uncalculated block in the cache 110, calculates a hash value of the selected data, and identifies a server in charge of the calculated hash value. The LBA managing unit 135 passes the data and the hash value on to the deduplication control unit 134 of the identified server, and instructs the deduplication control unit 134 to store the data and update the hash management table 121. Then, the LBA managing unit 135 updates the LBA management table 122 according to an instruction from the deduplication control unit 134.

FIG. 14 illustrates an example of a data structure of a history table. The history table 123 includes the following items: command group identifier (ID); reception time; and reception interval. Each field under the item "command group ID" contains information used to identify a detected sequential command group. Each field under the item "reception time" contains the time taken to receive the corresponding sequential command group. The reception time is, for example, a difference between the reception time of the initial command and that of the last command included in the corresponding sequential command group. Each field under the item "reception interval" contains the time interval before the start of receiving the next sequential command group.

Figure 15:
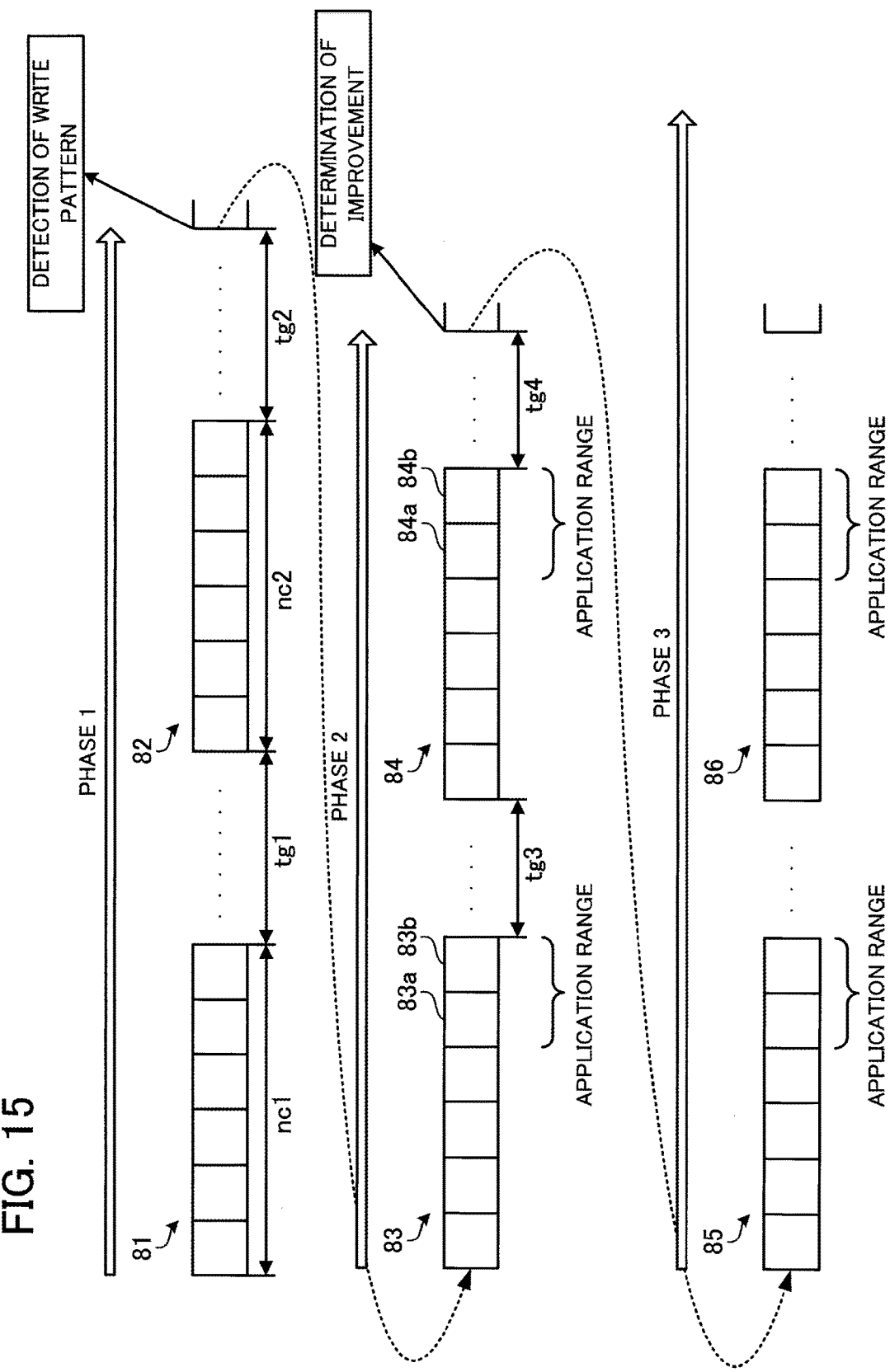
FIG. 15 illustrates an application mode determining process.

FIG. 15 illustrates an application mode determining process. The process of determining an application mode for each write command of a sequential command group is composed of three phases, Phases 1 to 3. In Phase 1, a write pattern is detected and an application range is determined which indicates whether to apply the postprocess mode to which write commands in individual sequential command groups belonging to the write pattern. Specifically, the detecting unit 132 detects sequential command groups associated with write commands issued from the same source and directed to the same logical volume. For example, in the case where a plurality of appropriate write commands (referred to as "first commands") are received at intervals each within a predetermined time period C and then an appropriate write command is received after an interval longer than the time period C, the received first commands are detected as a sequential command group. Note here that the time period C is set to a value greater than or equal to the above-described time interval tr. In addition, assume, for example, that when two write commands issued from the same source and directed to the same logical volume have been received at an interval within the time period C, a write command issued from a different source or directed to a different logical volume has actually been interposed between the two write commands. In this case also, these two write commands may be determined to belong to a sequential command group.

In the case of detecting a predetermined number of sequential command groups where a deviation of the reception times of the individual sequential command groups falls within a certain definite range and a deviation of the reception interval between every adjacent sequential command groups falls within a certain definite range, the detecting unit 132 determines that these sequential command groups belong to a write pattern. Note that the reception time is the time taken to receive the corresponding sequential command group, as described in FIG. 14.

In the example of FIG. 15, sequential command groups 81 and 82 are detected in Phase 1, and then a sequential command group 83 is detected. Assume that the reception times of the sequential command groups 81 and 82 are nc1 and nc2, respectively; the reception interval between the sequential command groups 81 and 82 is tg1; the reception interval between the sequential command groups 82 and 83 is tg2; and the number of sequential command groups needed to detect a write pattern is "2".

The detecting unit 132 detects a write pattern, for example, in the case where the variance of the reception times nc1 and nc2 falls within a fixed value and the variance of the reception intervals tg1 and tg2 also falls within a fixed value. With respect to the individual sequential command groups belonging to the write pattern, the mode determining unit 133 determines an application range to which the postprocess mode is applied. The application range is the range of write commands to which the postprocess mode is applied, and is composed of N (the above-mentioned number of applications) write commands selected from the end of each sequential command group. Assume in FIG. 15 that N=2. When the processing up to this point ends, the application mode determining process moves to Phase 2.

Note that, in Phase 1, the reception time nc1 and the reception interval tg1 are registered, within the history table 123, in a record corresponding to the sequential command group 81. Also, the reception time nc2 and the reception interval tg2 are registered in a record corresponding to the sequential command group 82. The detecting unit 132 detects a write pattern by referring to these records. Note that the number of write commands included in each sequential command group may be used in place of the reception time of each sequential command group. In this case, the condition on the number of write commands may be that the difference in the number of commands included in each sequential command group is 0, or less than or equal to a fixed value which is greater than or equal to 1.

Next, in Phase 2, the postprocess mode is actually applied to the determined application range, and whether throughput improvement of the host device 400 is achieved by the application is determined. Based on the determination results, it is then determined whether to apply the postprocess mode to the application range. In the example of FIG. 15, sequential command groups 83 to 86 are received following the sequential command groups 81 and 82. In Phase 2, the postprocess mode is applied to write commands 83a and 83b included in the application range of the sequential command group 83 and write commands 84a and 84b included in the application range of the sequential command group 84. Then, the reception times and the reception intervals associated with the sequential command groups 83 and 84 are subsequently monitored.

In the case where the reception intervals in Phase 2 are smaller than those in Phase 1, the mode determining unit 133 determines that the throughput improvement of the host device 400 has been achieved.

Assume in the example of FIG. 15 that the reception interval between the sequential command groups 83 and 84 is tg3; and the reception interval between the sequential command groups 84 and 85 is tg4. The mode determining unit 133 determines that the throughput improvement has been achieved, for example, when the average of the reception intervals tg3 and tg4 is less than the average of the reception intervals tg1 and tg2. When this determination process ends, the application mode determining process moves to Phase 3.

In Phase 3, the application of the postprocess mode to the determined application range is carried on when the throughput improvement has been achieved, while the application of the postprocess mode is discontinued if no improvement has been observed. In the example of FIG. 15, the throughput improvement is determined to have been achieved, and the postprocess mode is applied to the application range of each of the subsequent sequential command groups 85 and 86.

According to the processing described above, the server 100 continues to apply the postprocess mode only if throughput improvement of the host device 400 has been achieved by actually applying the postprocess mode to the determined application range. Herewith, the postprocess mode is applied only to a minimum number of effective write commands. Therefore, it is possible to definitely improve the throughput of the host device 400 while controlling an increase in processing load of the server 100.

Next described are processes of the server 100 with reference to flowcharts. The server 100 monitors write commands and performs the following processes of FIGS. 16 to 19 for each pair of a source (here, the host device 400) and a write destination logical volume. In other words, the processes of FIGS. 16 to 19 are performed each time the server 100 receives a write command issued from the same source and directed to the same logical volume.

Figure 16:
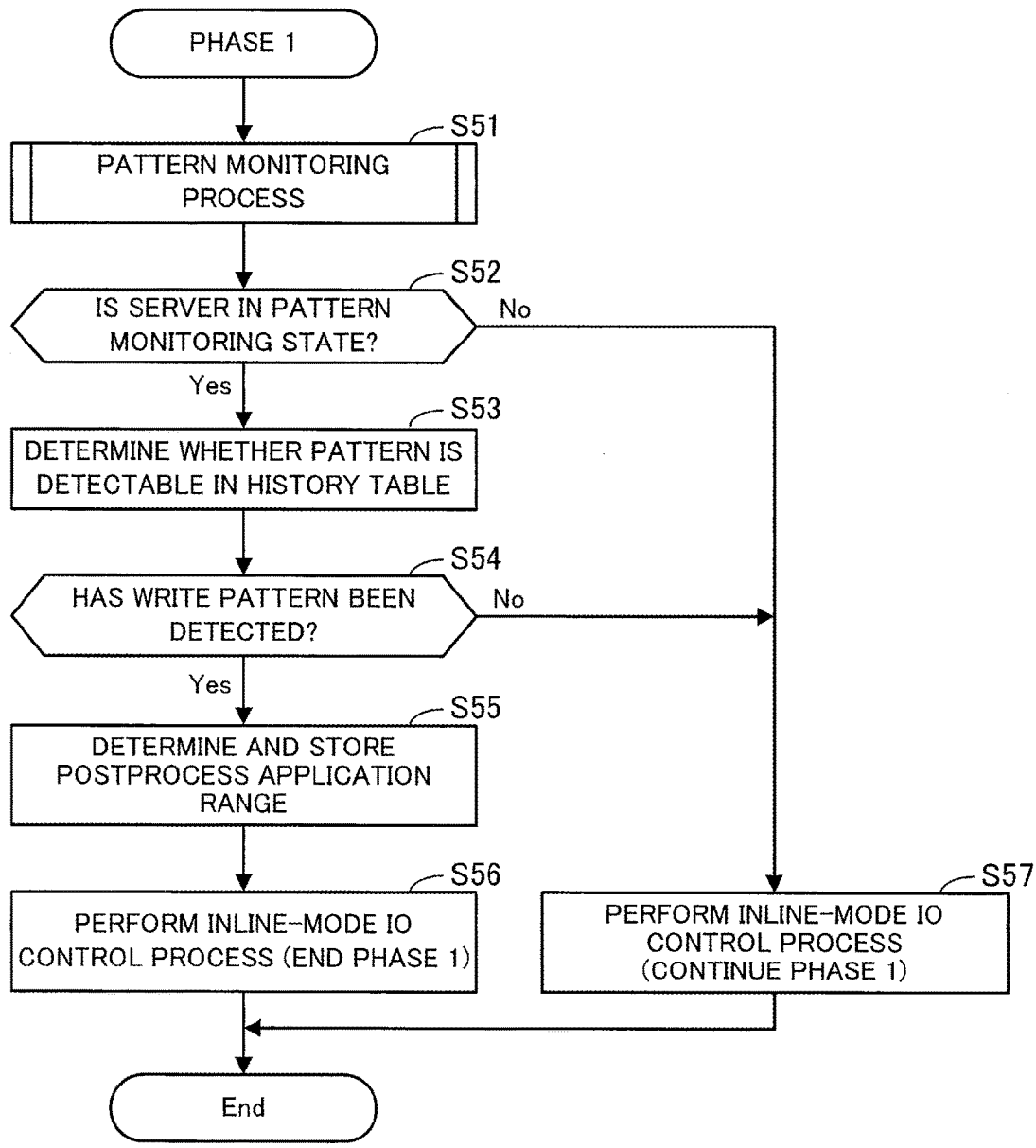
FIG. 16 is a flowchart illustrating a process example of Phase 1.

First, the process of Phase 1 illustrated in FIG. is performed in an initial state where appropriate write commands have yet to be received, or in a state where reception of a write pattern corresponding to appropriate write commands is completed. FIG. 16 is a flowchart illustrating a process example of Phase 1.

[Step S51] The server 100 performs a pattern monitoring process illustrated in FIG. 17 below.

Figure 17:
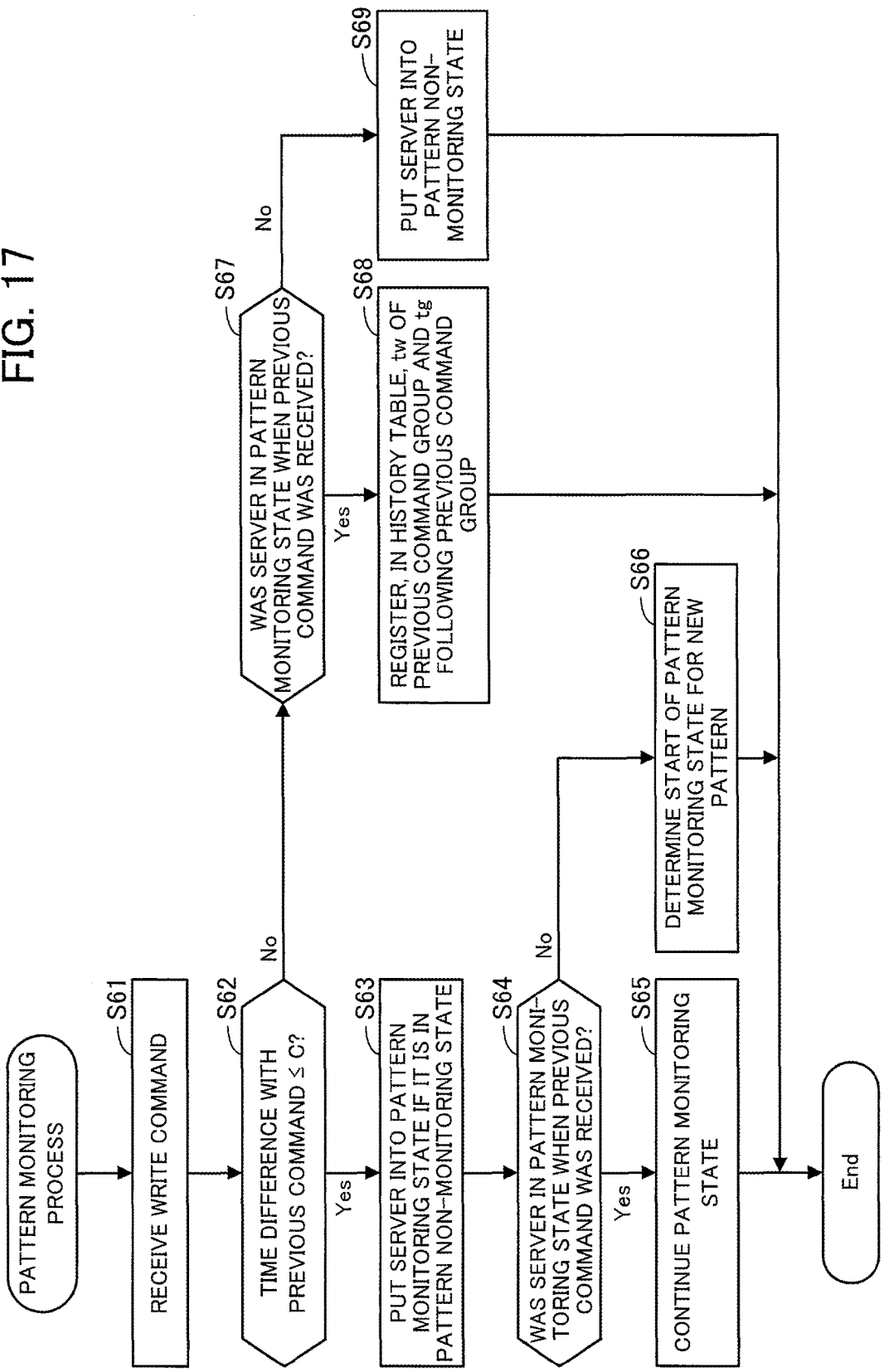
FIG. 17 is a flowchart illustrating an example of a pattern monitoring process.

FIG. 17 is a flowchart illustrating an example of the pattern monitoring process. Assume that the server 100 is in a "pattern non-monitoring state" when the process of FIG. 17 is performed for the first time.

[Step S61] The detecting unit 132 detects that the IO control unit 131 has received an appropriate write command (that is, a write command issued from a particular source and directed to a particular logical volume).

[Step S62] The detecting unit 132 determines whether the time difference between the time of reception of the write command in step S61 and the time of reception of a previous appropriate write command is less than or equal to the predetermined time period C. If the time difference is less than or equal to the time period C, the detecting unit 132 determines that the current write command and the previous write command belong to a sequential command group and moves to step S63. On the other hand, if the time difference exceeds the time period C, the detecting unit 132 determines that the current write command is the initial write command of a sequential command group and moves to step S67.

[Step S63] If the current state is a pattern non-monitoring state, the detecting unit 132 puts the server 100 into a "pattern monitoring state". In this regard, a corresponding history table 123 is generated in the storing unit 120. Note that information indicating whether the server 100 is in the pattern monitoring or non-monitoring state may be stored in the storing unit 120.

[Step S64] The detecting unit 132 determines whether the server 100 was in a pattern monitoring state when the previous appropriate command was received. If the server 100 was in a pattern monitoring state, the detecting unit 132 moves to step S65. If the server 100 was in a pattern non-monitoring state, the detecting unit 132 moves to step S66.

[Step S65] The detecting unit 132 continues the pattern monitoring state.

[Step S66] The detecting unit 132 determines that the pattern monitoring state has been initiated to detect a new write pattern. In this regard, the detecting unit 132 continues the pattern monitoring state, and also resets information accumulated in the corresponding history table 123.

[Step S67] The detecting unit 132 determines whether the server 100 was in a pattern monitoring state when the previous appropriate command was received. If the server 100 was in a pattern monitoring state, the detecting unit 132 moves to step S68. If the server 100 was in a pattern non-monitoring state, the detecting unit 132 moves to step S69.

[Step S68] The detecting unit 132 registers, in a new record of the history table 123, a reception time tw of a sequential command group to which the previously received appropriate write command belongs and a reception interval tg between the reception of the last command of the sequential command group and the reception of the current write command. Note that the detecting unit 132 registers the time period tg following the previous sequential command group under the item "reception interval" in the history table 123.

[Step S69] The detecting unit 132 puts the server 100 into the pattern non-monitoring state.

Now let us refer back to FIG. 16.

[Step S52] The detecting unit 132 determines whether the server 100 is currently in the pattern monitoring state. If the server 100 is in the pattern monitoring state, the detecting unit 132 moves to step S53. If the server 100 is in the pattern non-monitoring state, the detecting unit 132 moves to step S57.

[Step S53] Referring to the history table 123, the detecting unit 132 determines whether a write pattern is detectable. If the history table 123 registers therein a predetermined number P of records, i.e., the predetermined number P of sequential command groups, the detecting unit 132 determines that a write pattern is detectable.

[Step S54] The detecting unit 132 determines whether a write pattern has been detected. When determining, in step S53, that a write pattern is detectable, the detecting unit 132 performs a write pattern detecting process using information on the latest P records registered in the history table 123. If a deviation of the reception times of the detected sequential command groups falls within a certain definite range and a deviation of the reception interval between every adjacent sequential command groups falls within a certain definite range, the detecting unit 132 determines that a write pattern has been detected. If a write pattern has been detected, the detecting unit 132 moves to step S55. If no write pattern has been detected, the detecting unit 132 moves to step S57.

[Step S55] The mode determining unit 133 determines an application range to which the postprocess mode is applied. The mode determining unit 133 calculates the number of application N by plugging, into Equation (1), the time interval 124 (tr), the inline response time 125 (t1), and the postprocess response time 126 (t2). The mode determining unit 133 determines N write commands from the end of each sequential command group as the application range of the sequential command group. The mode determining unit 133 stores, in the storing unit 120, information indicating the application range.

[Step S56] The mode determining unit 133 selects the inline mode as a write control mode for the write command received in step S51. The IO control unit 131 performs the inline-mode IO control process. In addition, Phase 1 ends in step S56, and Phase 2 illustrated in FIG. 18 starts when a next appropriate write command is received.

[Step S57] The mode determining unit 133 selects the inline mode as a write control mode for the write command received in step S51. The IO control unit 131 performs the inline-mode IO control process. In addition, Phase 1 is continued in step S57, and the process of FIG. 16 is performed again when a next appropriate write command is received.

Figure 18:
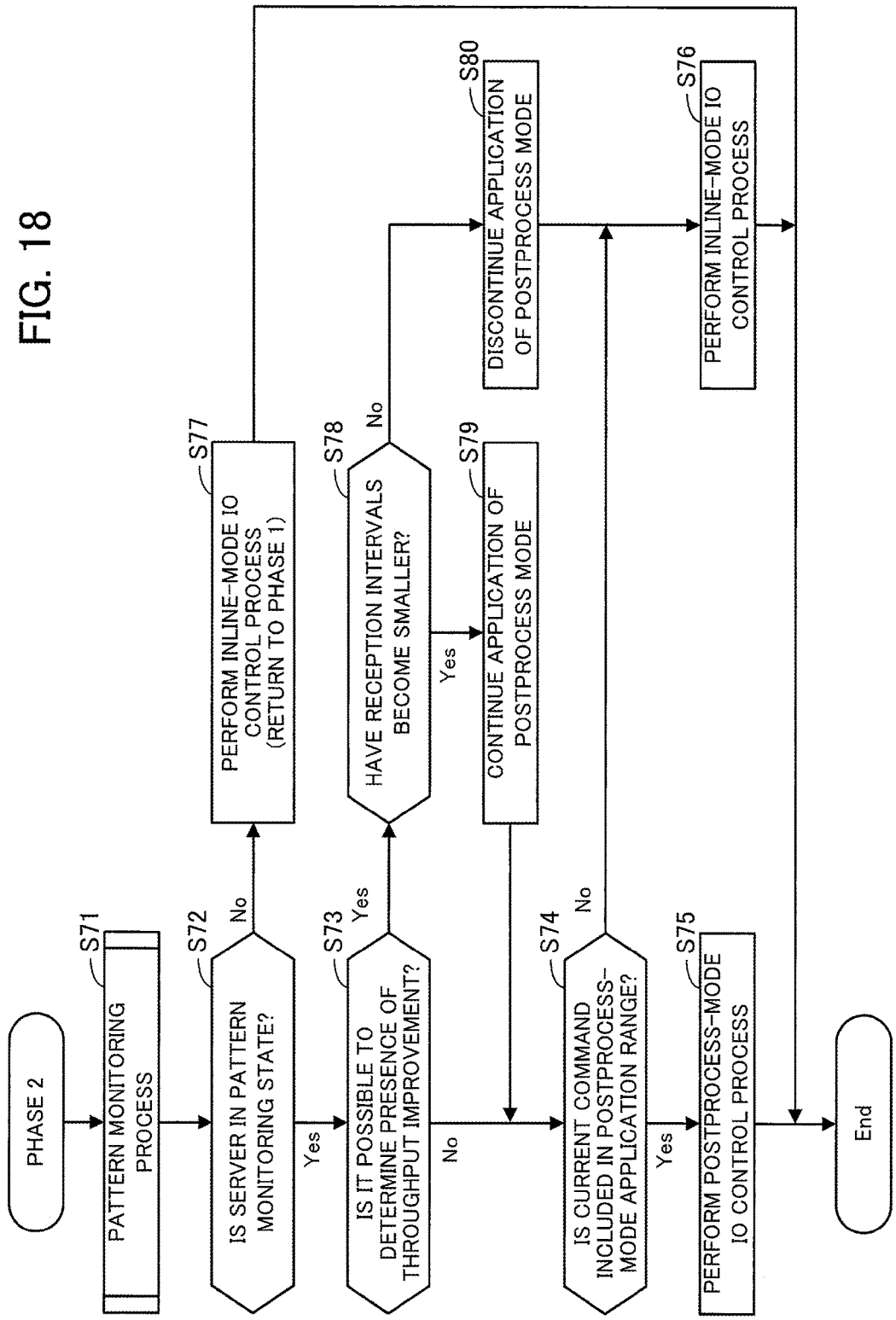
FIG. 18 is a flowchart illustrating a process example of Phase 2.

FIG. 18 is a flowchart illustrating a process example of Phase 2.

[Step S71] The server 100 performs the pattern monitoring process illustrated in FIG. 17.

[Step S72] The mode determining unit 133 determines whether the server 100 is currently in the pattern monitoring state. If the server 100 is in the pattern monitoring state, the mode determining unit 133 moves to step S73. If the server 100 is in the pattern non-monitoring state, the mode determining unit 133 moves to step S77.

[Step S73] Referring to the history table 123, the mode determining unit 133 determines if it is possible to determine the presence or absence of throughput improvement of the host device 400. The mode determining unit 133 determines that it is possible to determine the presence or absence of throughput improvement in the case where further a predetermined number Q of records, i.e., the predetermined number Q of sequential command groups, have been registered in the history table 123 after the write pattern is detected in step S54 of FIG. 16. If it is possible to determine the presence or absence of throughput improvement, the mode determining unit 133 moves to step S78. If not, the mode determining unit 133 moves to step S74.

[Step S74] The mode determining unit 133 determines whether the current write command (the write command received in step S71) is included in the postprocess-mode application range. If the current write command is included in the postprocess-mode application range, the mode determining unit 133 moves to step S75. If not, the mode determining unit 133 moves to step S76.

[Step S75] The mode determining unit 133 selects the postprocess mode as a write control mode for the write command received in step S71. The IO control unit 131 performs the postprocess-mode IO control process.

In addition, in the case of having entered step S74 via step S79, the mode determining unit 133 ends Phase 2 because the determination of the presence or absence of throughput improvement has been completed. In this case, Phase 3 starts when a next appropriate write command is received. On the other hand, in the case of having entered step S74 without going through step S79, the mode determining unit 133 continues Phase 2. In this case, the process of FIG. 18 is performed again when a next appropriate write command is received.

[Step S76] The mode determining unit 133 selects the inline mode as a write control mode for the write command received in step S71. The IO control unit 131 performs the inline-mode IO control process.

In addition, the mode determining unit 133 ends Phase 2 in the case of having entered step S74 via step S79 or having gone through step S80. In this case, Phase 3 starts when a next appropriate write command is received. On the other hand, in the case of having entered step S74 without going through step S79, the mode determining unit 133 continues Phase 2. In this case, the process of FIG. 18 is performed again when a next appropriate write command is received.

[Step S77] The mode determining unit 133 selects the inline mode as a write control mode for the write command received in step S71. The IO control unit 131 performs the inline-mode IO control process. In addition, the mode determining unit 133 deletes information registered in the history table 123. Then, the mode determining unit 133 ends Phase 2 and sets the application mode determining process back to Phase 1. In this case, Phase 1 illustrated in FIG. 16 is performed when a next appropriate write command is received.

[Step S78] By referring to the history table 123, the mode determining unit 133 compares reception intervals in Phase 2 with those in Phase 1. For example, the mode determining unit 133 refers to the latest Q records registered in the history table 123 and calculates an average AVE1 of the reception intervals of the Q records. In addition, the mode determining unit 133 refers to P records immediately preceding the Q records and calculates an average AVE2 of the reception intervals of the P records. If the average AVE2 is less than the average AVE1, the mode determining unit 133 determines that the reception intervals in Phase 2 are smaller than those in Phase 1. In the case where the reception intervals in Phase 2 are smaller, it is determined that the throughput improvement of the host device 400 has been achieved by the application of the postprocess mode. If the reception intervals in Phase 2 are smaller, the mode determining unit 133 moves to step S79. If not, the mode determining unit 133 moves to step S80.

[Step S79] In this case, it is determined that the throughput improvement of the host device 400 has been achieved. The mode determining unit 133 sets, in the storing unit 120, information indicating continuation of the postprocess-mode application to the application range.

[Step S80] In this case, it is determined that no throughput improvement of the host device 400 has been achieved. The mode determining unit 133 sets, in the storing unit 120, information indicating discontinuation of the postprocess-mode application to the application range.

Figure 19:
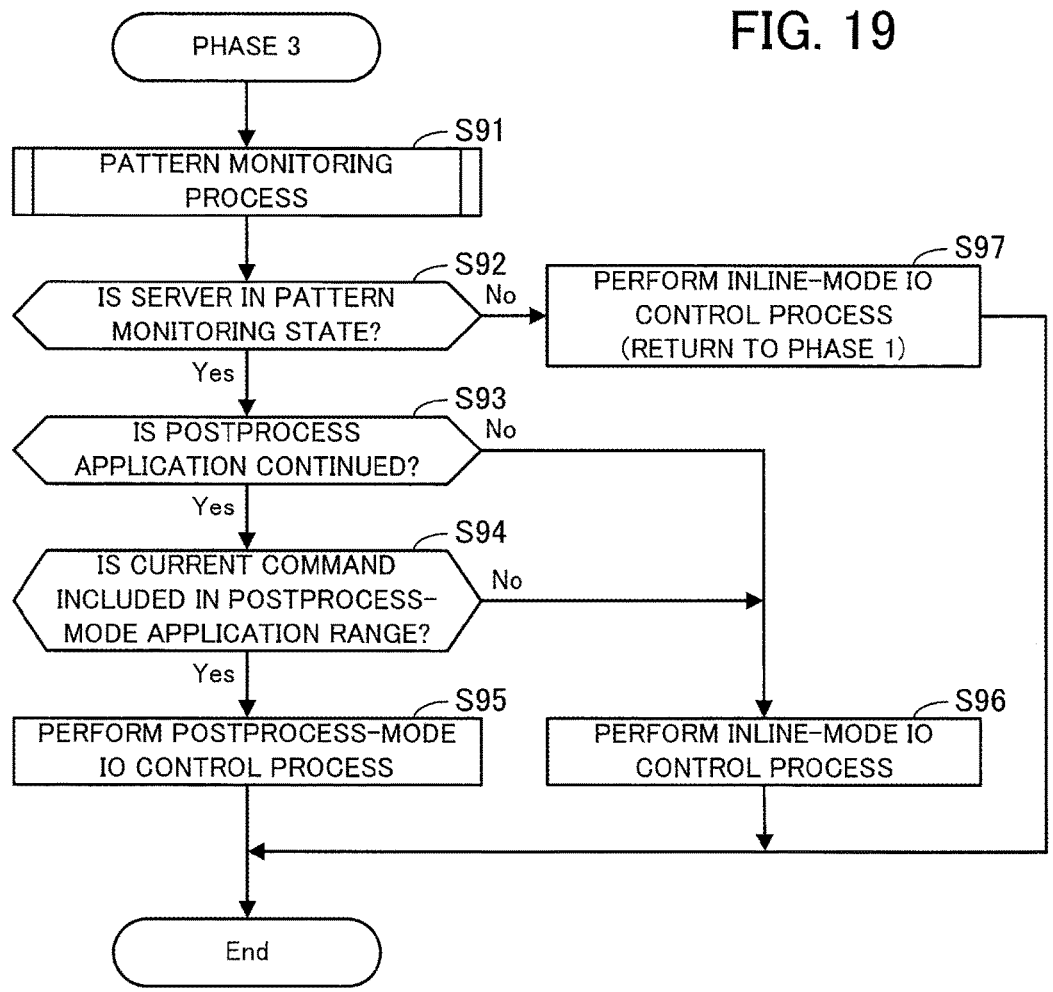
FIG. 19 is a flowchart illustrating a process example of Phase 3.

FIG. 19 is a flowchart illustrating a process example of Phase 3.

[Step S91] The server 100 performs the pattern monitoring process illustrated in FIG. 17.

[Step S92] The mode determining unit 133 determines whether the server 100 is currently in the pattern monitoring state. If the server 100 is in the pattern monitoring state, the mode determining unit 133 moves to step S93. If the server 100 is in the pattern non-monitoring state, the mode determining unit 133 moves to step S97.

[Step S93] The mode determining unit 133 determines whether, in Phase 2, information indicating continuation of the postprocess-mode application has been set. If the information indicating continuation of the application is set in step S79 of FIG. 18, the mode determining unit 133 moves to step S94. If information indicating discontinuation of the application is set in step S80 of FIG. 19, the mode determining unit 133 moves to step S96.

[Step S94] The mode determining unit 133 determines whether the current write command (the write command received in step S91) is included in the postprocess-mode application range. If the current write command is included in the postprocess-mode application range, the mode determining unit 133 moves to step S95. If not, the mode determining unit 133 moves to step S96.

[Step S95] The mode determining unit 133 selects the postprocess mode as a write control mode for the write command received in step S91. The IO control unit 131 performs the postprocess-mode IO control process. In addition, the mode determining unit 133 continues Phase 3. In this case, the process of FIG. 19 is performed again when a next appropriate write command is received.

[Step S96] The mode determining unit 133 selects the inline mode as a write control mode for the write command received in step S91. The IO control unit 131 performs the inline-mode IO control process. In addition, the mode determining unit 133 continues Phase 3. In this case, the process of FIG. 19 is performed again when a next appropriate write command is received.

[Step S97] The mode determining unit 133 selects the inline mode as a write control mode for the write command received in step S91. The IO control unit 131 performs the inline-mode IO control process. In addition, the mode determining unit 133 deletes information registered in the history table 123. Then, the mode determining unit 133 ends Phase 3 and sets the application mode determining process back to Phase 1. In this case, Phase 1 illustrated in FIG. 16 is performed when a next appropriate write command is received.

Figure 20:
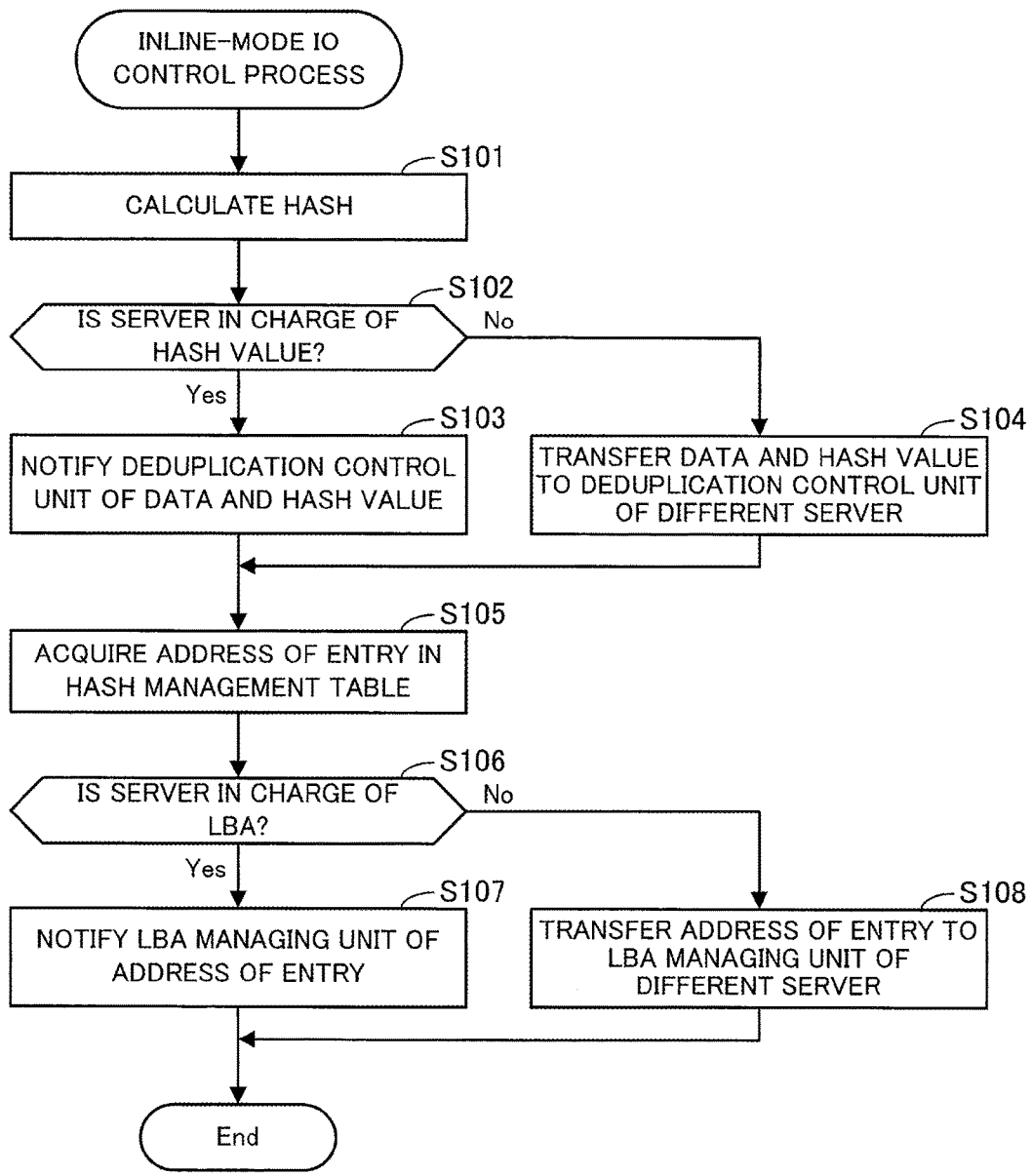
FIG. 20 is a flowchart illustrating an example of an inline-mode input-output (IO) control process procedure.

FIG. 20 is a flowchart illustrating an example of an inline-mode IO control process procedure. The process of FIG. 20 is performed when the mode determining unit 133 has selected the inline mode as the write control mode.

[Step S101] The IO control unit 131 calculates a hash value of write data. The hash value is calculated, for example, using a hash function known as SHA-1 (Secure Hash Algorithm 1).

[Step S102] Based on the hash initial value of the calculated hash value, the IO control unit 131 identifies a server in charge of the hash value, and determines whether the server 100 including the IO control unit 131 itself is a server in charge of the calculated hash value. If the server 100 is the server in charge, the IO control unit 131 moves to step S103. If not, the IO control unit 131 moves to step S104.

[Step S103] The IO control unit 131 notifies the write data and the hash value to the deduplication control unit 134 of the server 100 including the IO control unit 131 itself, and then instructs the deduplication control unit 134 to write the write data.

[Step S104] The IO control unit 131 transfers the write data and the hash value to the deduplication control unit 134 of a different server 100 in charge of the calculated hash value, and then instructs the deduplication control unit 134 to write the write data.

[Step S105] The IO control unit 131 acquires the address of a corresponding entry in the hash management table 121 from the notification destination of step S103 or the transfer destination of step S104.

[Step S106] Based on an LBA designated as the destination of the write data, the IO control unit 131 identifies a server in charge of the LBA, and determines whether the server 100 including the IO control unit 131 itself is a server in charge of the designated LBA. If the server 100 is in charge of the LBA, the IO control unit 131 moves to step S107. If not, the IO control unit 131 moves to step S108.

[Step S107] The IO control unit 131 notifies the address of the entry acquired in step S105 and the LBA designated as the write destination to the LBA managing unit 135 of the server 100 including the IO control unit 131 itself, and then instructs the LBA managing unit 135 to update the LBA management table 122.

[Step S108] The IO control unit 131 transfers the address of the entry acquired in step S105 and the LBA designated as the write destination to the LBA managing unit 135 of a different server 100 in charge of the designated LBA, and then instructs the LBA managing unit 135 to update the LBA management table 122.

Figure 21:
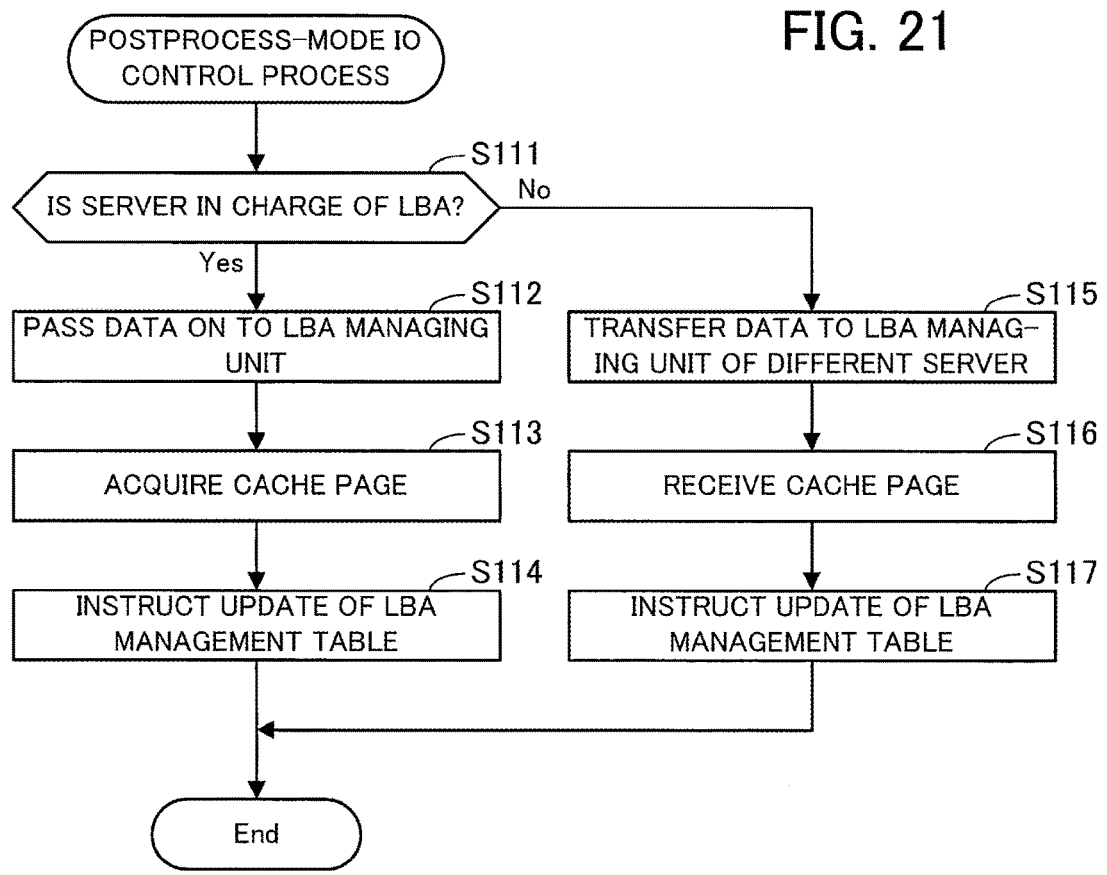
FIG. 21 is a flowchart illustrating an example of a postprocess-mode IO control process procedure.

FIG. 21 is a flowchart illustrating an example of a postprocess-mode IO control process procedure. The process of FIG. 21 is performed when the mode determining unit 133 has selected the postprocess mode as the write control mode.

[Step S111] Based on an LBA designated as the destination of the write data, the IO control unit 131 identifies a server in charge of the LBA, and determines whether the server 100 including the IO control unit 131 itself is a server in charge of the designated LBA. If the server 100 is in charge of the LBA, the IO control unit 131 moves to step S112. If not, the IO control unit 131 moves to step S115.

[Step S112] The IO control unit 131 notifies the write data to the LBA managing unit 135 of the server 100 including the 10 control unit 131 itself, and instructs the LBA managing unit 135 to store the write data in the cache 110.

[Step S113] The 10 control unit 131 acquires, from the LBA managing unit 135 notified of the write data in step S112, the page number of a cache page that holds the write data.

[Step S114] The 10 control unit 131 notifies the acquired page number and the LBA designated as the write destination to the LBA managing unit 135 of the server 100 including the 10 control unit 131 itself, and instructs the LBA managing unit 135 to update the LBA management table 122.

[Step S115] The 10 control unit 131 transfers the write data to the LBA managing unit 135 of a different server 100 in charge of the designated LBA, and instructs the LBA managing unit 135 to store the write data in the cache 110.

[Step S116] The 10 control unit 131 receives the page number of a cache page that holds the write data from the LBA managing unit 135 to which the write data is transferred in step S115.

[Step S117] The 10 control unit 131 transfers the acquired page number and the LBA designated as the write destination to the LBA managing unit 135 of a different server 100 in charge of the designated LBA, and instructs the LBA managing unit 135 to update the LBA management table 122.

Figure 22:
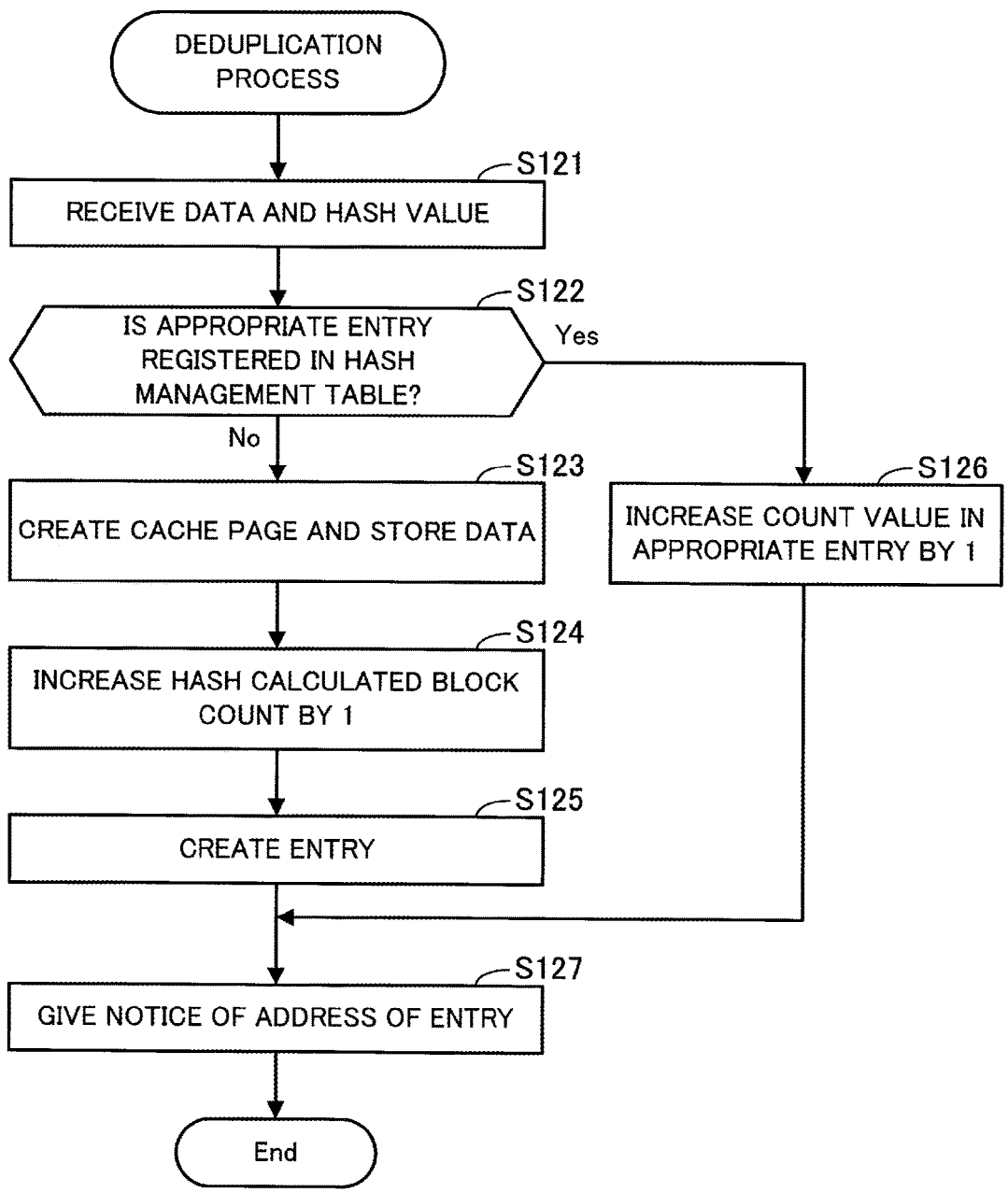
FIG. 22 is a flowchart illustrating an example of a deduplication process procedure.

FIG. 22 is a flowchart illustrating an example of a deduplication process procedure.

[Step S121] The deduplication control unit 134 receives write data and a hash value together with a write instruction. For example, according to step S103 or S104 of FIG. 20, the deduplication control unit 134 receives a write instruction from the IO control unit 131 of one server 100. Alternatively, according to step S154 or S155 of FIG. 25 described later, the deduplication control unit 134 receives a write instruction from the IO control unit 131 of one server 100.

[Step S122] The deduplication control unit 134 determines whether an entry including the received hash value is registered in the hash management table 121. If the entry is registered, the deduplication control unit 134 moves to step S126. If not, the deduplication control unit 134 moves to step S123.

[Step S123] When it is determined, in step S122, that the entry is not registered, data with identical content to that of the received write data is not yet stored in the cache 110 or the storage unit 200. In this case, the deduplication control unit 134 creates a new cache page in the cache 110 and then stores the write data on the cache page. The write data is stored in the cache 110 as data of a hash calculated block.

[Step S124] The deduplication control unit 134 increases the count value of the hash calculated block count 128 of the storing unit 120 by 1.

[Step S125] The deduplication control unit 134 creates a new entry in the hash management table 121. The deduplication control unit 134 registers, in the created entry, the received hash value under the item "hash value"; the page number of the cache page on which the write data is stored in step S123 under the item "pointer"; and "1" under the item "count value".

[Step S126] When it is determined, in step S122, that the entry is registered, data with identical content to that of the received write data is already stored in the cache 110 or the storage unit 200. In this case, the deduplication control unit 134 identifies, within the hash management table 121, an entry in which the hash value received in step S121 is registered. The deduplication control unit 134 increases, in the identified entry, the value under the item "count value" by 1. In addition, the deduplication control unit 134 discards the write data and hash value received in step S121. The operation of step S126 enables deduplicated write data to be stored in a storage node.

[Step S127] The deduplication control unit 134 gives notice of the address of the entry created in step S125 or identified in step S126. If, in step S121, the deduplication control unit 134 receives the write instruction from the IO control unit 131 or the LBA managing unit 135 of the server 100 including the deduplication control unit 134 itself, the deduplication control unit 134 notifies the address of the entry to the IO control unit 131 or the LBA managing unit 135 of the same server 100. On the other hand, if, in step S121, the deduplication control unit 134 receives the write instruction from the IO control unit 131 or the LBA managing unit 135 of a different server 100, the deduplication control unit 134 transfers the address of the entry to the IO control unit 131 or the LBA managing unit 135 of the different server 100.

Figure 23:
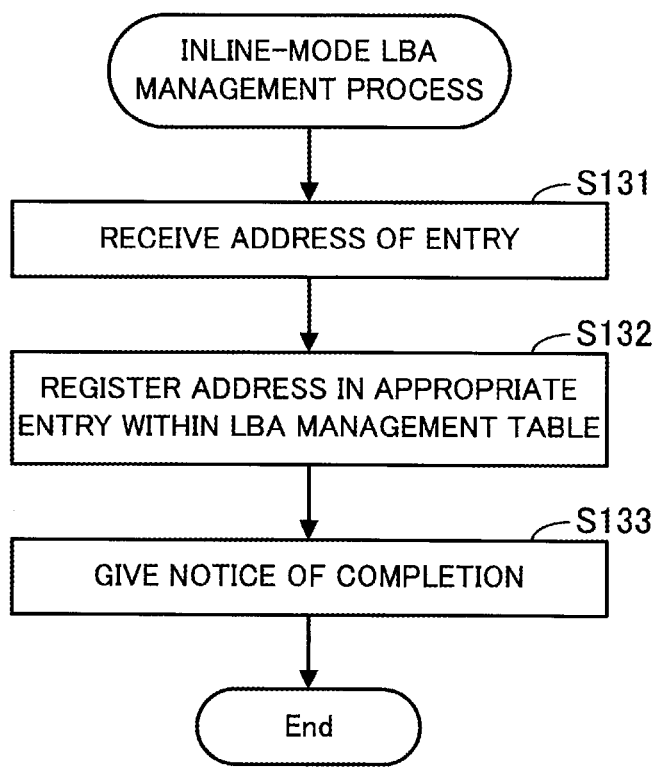
FIG. 23 is a flowchart illustrating an example of an inline-mode LBA management process procedure.

FIG. 23 is a flowchart illustrating an example of an inline-mode LBA management process procedure.

[Step S131] The LBA managing unit 135 receives the address of an entry in the hash management table 121 and an LBA designated as the write data destination together with a table update instruction. For example, according to step S107 or S108 of FIG. 20, the LBA managing unit 135 receives a table update instruction from the IO control unit 131 of one server 100.

[Step S132] The LBA managing unit 135 identifies, within the LBA management table 122, an entry including the LBA received in step S131. The LBA managing unit 135 registers the address of the entry received in step S131 in the identified entry, under the item "pointer".

[Step S133] The LBA managing unit 135 transmits a notification message about the completion of the table update to the IO control unit 131 having issued the table update instruction.

The process of FIG. 23 above is directed to data of hash calculated blocks and allows mappings between LBAs and entries in the hash management table 121.

Figure 24:
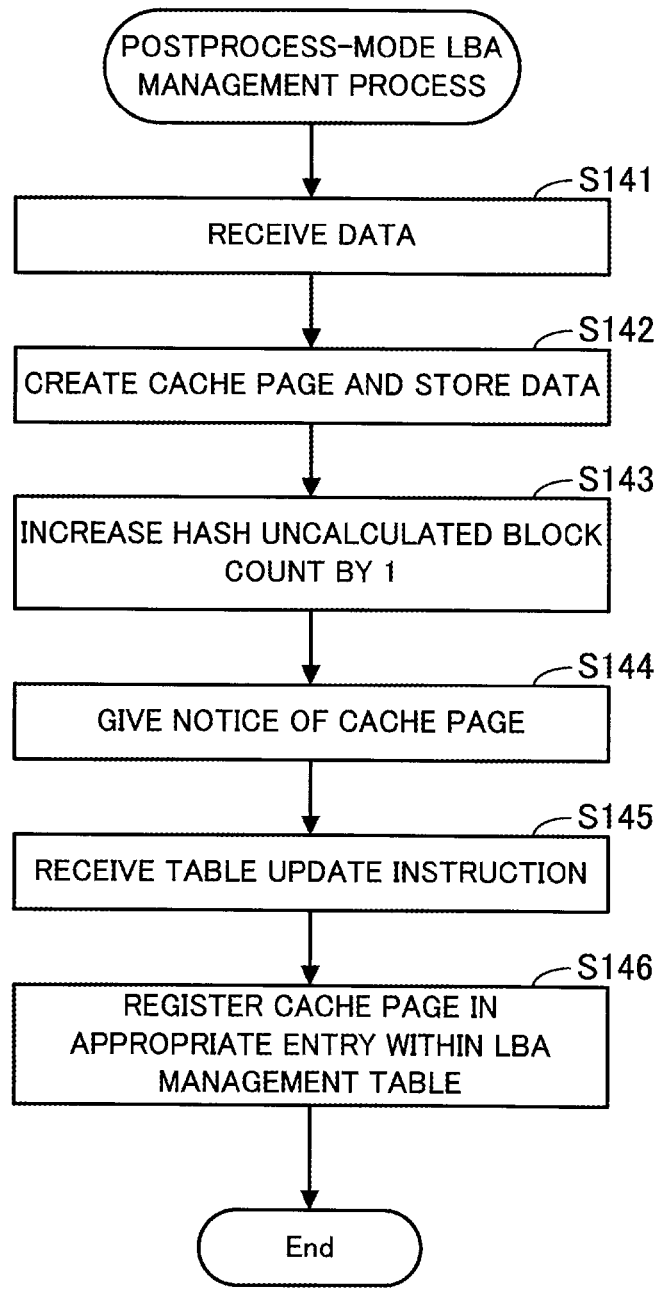
FIG. 24 is a flowchart illustrating an example of a postprocess-mode LBA management process procedure.

FIG. 24 is a flowchart illustrating an example of a postprocess-mode LBA management process procedure.

[Step S141] The LBA managing unit 135 receives write data together with an instruction of storing the write data in the cache 110. For example, according to step S112 or S115 of FIG. 21, the LBA managing unit 135 receives a storage instruction from the IO control unit 131 of one server 100.

[Step S142] The LBA managing unit 135 creates a new cache page in the cache 110 and stores the write data on the cache page. The write data is stored in the cache 110 as data of a hash uncalculated block.

[Step S143] The LBA managing unit 135 increases the hash uncalculated block count 127 of the storing unit 120 by 1.

[Step S144] The LBA managing unit 135 notifies the page number of the cache page created in step S142 to the IO control unit 131 having issued the instruction of step S141.

[Step S145] The LBA managing unit 135 receives the page number of the cache page and an LBA designated as a write data destination together with a table update instruction. For example, according to step S114 or S117 of FIG. 21, the LBA managing unit 135 receives a table update instruction from the IO control unit 131 of one server 100.

[Step S146] The LBA managing unit 135 identifies, within the LBA management table 122, an entry including the LBA received in step S145. The LBA managing unit 135 registers the page number received in step S145 in the identified entry, under the item "pointer".

Note that the page number registered in step S146 is the same as the page number notified in step S144. Therefore, the LBA managing unit 135 may skip steps S144 and S145, and then perform, in step S146, the table update upon receiving the LBA and the table update instruction. Alternatively, the LBA managing unit 135 may receive the LBA in step S141. The process of FIG. 24 above is directed to data of hash uncalculated blocks and allows mappings between LBAs and cache pages.

Figure 25:
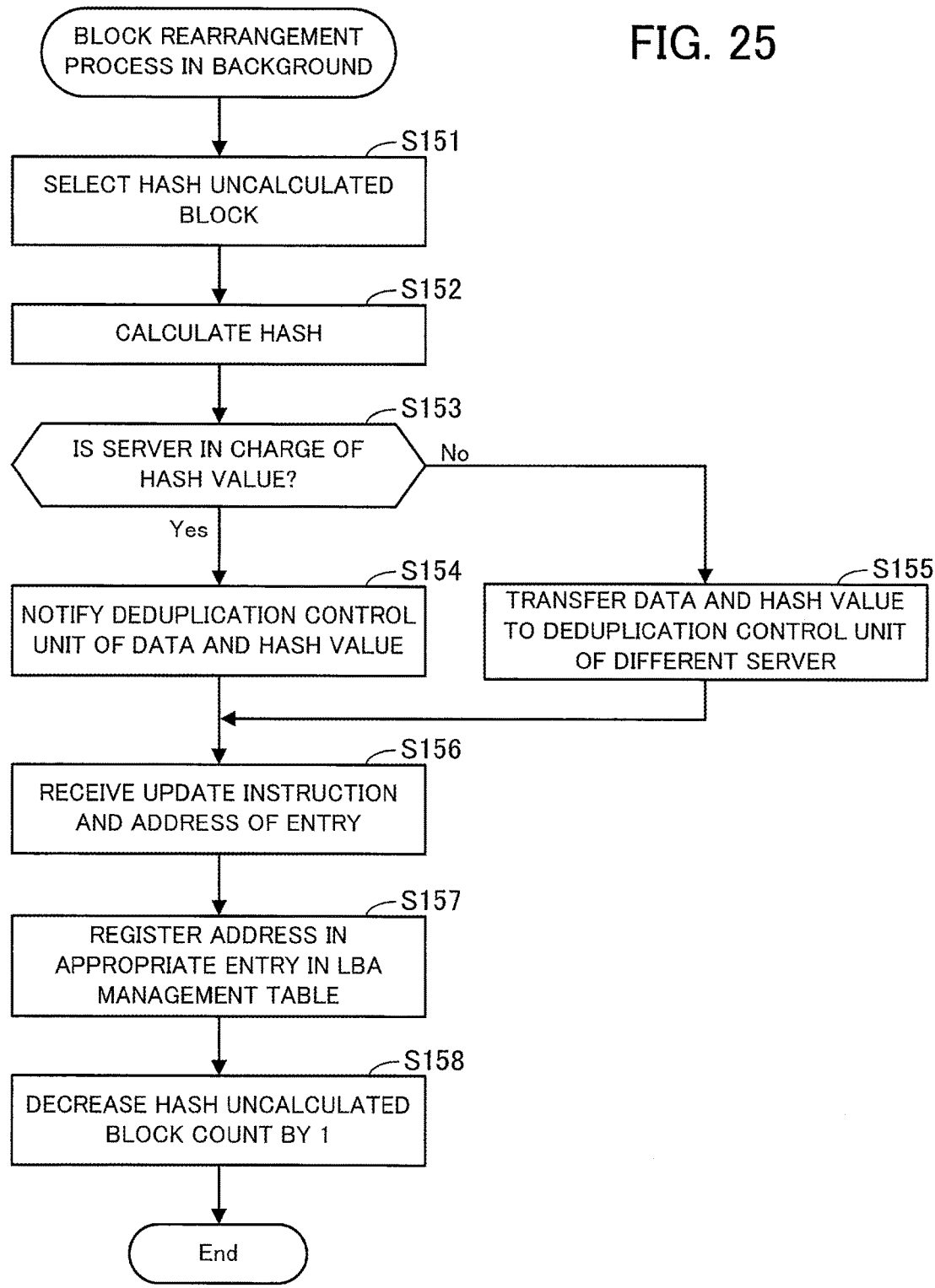
FIG. 25 is a flowchart illustrating an example of a block rearrangement process run in the background.

FIG. 25 is a flowchart illustrating an example of a block rearrangement process run in the background. The process of FIG. 25 is performed asynchronously and in parallel with a write control process, from receiving a write command through returning a response to the write command.

[Step S151] The LBA managing unit 135 selects data of one hash uncalculated block stored in the cache 110. For example, the LBA managing unit 135 identifies, within the LBA management table 122, entries in each of which the page number of a cache page is registered under the item "pointer". The LBA managing unit 135 selects, amongst the identified entries, an entry whose page number has the earliest registration time or an entry least frequently accessed by the host device 400. Data stored in a cache page indicated by the page number registered in the selected entry is data of the hash uncalculated block to be selected.

[Step S152] The LBA managing unit 135 calculates a hash value based on the date of the selected hash uncalculated block.

[Step S153] Based on the hash initial value of the calculated hash value, the LBA managing unit 135 identifies a server in charge of the hash value, and identifies whether the server 100 including the LBA managing unit 135 itself is the server in charge of the calculated hash value. If the server 100 including the LBA managing unit 135 itself is the server in charge, the LBA managing unit 135 moves to step S154. If not, the LBA managing unit 135 moves to step S155.

[Step S154] The LBA managing unit 135 notifies the data of the hash uncalculated block and the hash value to the deduplication control unit 134 of the server 100 including the LBA managing unit 135 itself, and then instructs the deduplication control unit 134 to write the data.

[Step S155] The LBA managing unit 135 transfers the write data and the hash value to the deduplication control unit 134 of a different server 100 in charge of the calculated hash value, and then instructs the deduplication control unit 134 to write the data.

[Step S156] The LBA managing unit 135 receives the address of an entry in the hash management table 121 together with a table update instruction from the LBA managing unit 135 which is notified of the data and hash value in step S154 or the LBA managing unit 135 to which the data and hash value are transferred in step S155. This entry is an entry corresponding to the hash value calculated in step S152, and holds location information of a physical storage area which registers the hash uncalculated block selected in step S151 as a hash calculated block.

[Step S157] The LBA managing unit 135 identifies, within the LBA management table 122, an entry corresponding to the data of the hash uncalculated block selected in step S151. The LBA managing unit 135 registers the address of the entry received in step S156 by overwriting existing information in the identified entry, under the item "pointer".

[Step S158] The LBA managing unit 135 decreases the hash uncalculated block count 127 of the storing unit 120 by 1.

The process of FIG. 25 allows data of a hash uncalculated block to be deduplicated and rearranged in the cache 110 of one server 100 in the background.

Figure 26:
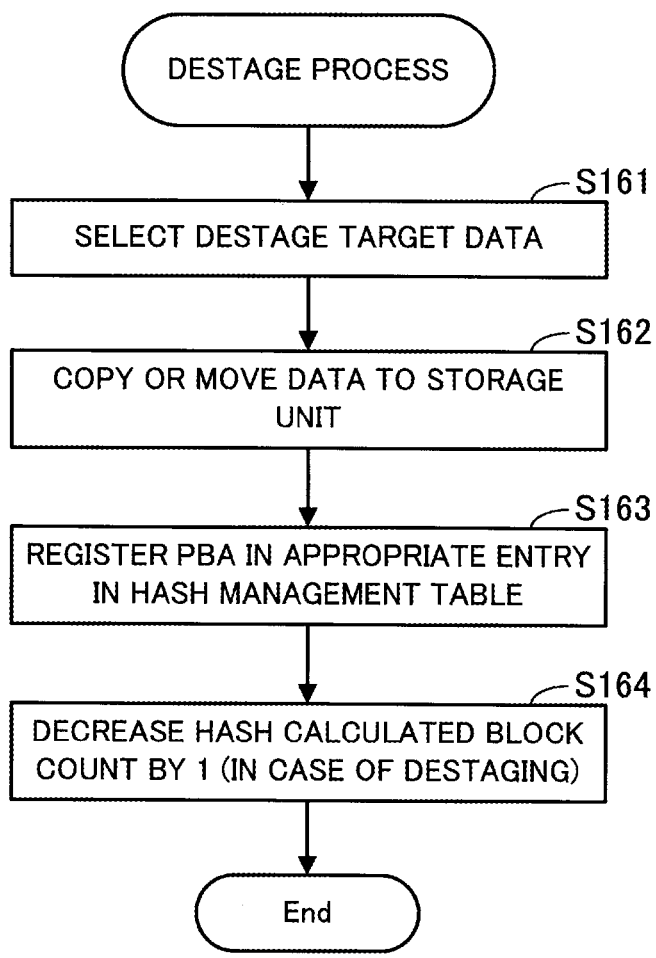
FIG. 26 is a flowchart illustrating an example of a destage process procedure.

FIG. 26 is a flowchart illustrating an example of a destage process procedure. The process of FIG. 26 is performed in parallel with the write control processes of FIGS. 16 to 24 and the block rearrangement process of FIG. 25.

[Step S161] The IO control unit 131 selects data to be destaged amongst data of hash calculated blocks stored in the cache 110. For example, when the capacity of the cache 110 runs short, the IO control unit 131 selects, amongst data of hash calculated blocks stored in the cache 110, data with the earliest last access date and time as the destage target data. In this case, the destage target data is data to be removed from the cache 110. Alternatively, for example, the IO control unit 131 may identify, amongst data of hash calculated blocks stored in the cache 110, dirty data that is not synchronized to data in the storage unit 200. In this case, the IO control unit 131 selects, for example, data with the earliest update date and time amongst the identified dirty data as the destage target.

[Step S162] The IO control unit 131 stores the selected data in the storage unit 200. In the case where the selected data is to be destaged, the IO control unit 131 moves the data from the cache 110 to the storage unit 200. In the case where the selected data is not to be destaged, the IO control unit 131 copies the data to the storage unit 200 from the cache 110.

[Step S163] The IO control unit 131 identifies, within the hash management table 121, an entry corresponding to the destage target data. For example, the IO control unit 131 calculates a hash value of the selected data and then identifies an entry that registers the calculated hash value. The IO control unit 131 registers a physical address (PBA) indicating a location at which the data is stored in step S162 in the identified entry, under the item "pointer".

[Step S164] This step is carried out only when the selected data is to be destaged and is removed from the cache 110 in step S162. The IO control unit 131 decreases the hash calculated block count 128 of the storing unit 120 by 1.

Note that the processing functions of each of the apparatuses (for example, the information processor 1, the servers 100a to 100c, and the host devices 400a and 400b) described in the embodiments above may be achieved by a computer. In this case, a program is made available in which processing details of the functions to be provided to each of the above-described apparatuses are described. By executing the program on the computer, the above-described processing functions are achieved on the computer. The program in which processing details are described may be recorded in a computer-readable recording medium. Such computer-readable recording media include a magnetic-storage device, an optical disk, a magneto-optical recording medium, and a semiconductor memory. Examples of the magnetic-storage device are a hard disk drive (HDD), a flexible disk (FD), and a magnetic tape. Example of the optical disk are a digital versatile disc (DVD), a DVD-RAM, a compact disc-read only memory (CD-ROM), a CD-recordable (CD-R), and a CD-rewritable (CD-RW). An example of the magneto-optical recording medium is a magneto-optical disk (MO).

In the case of distributing the program, for example, portable recording media, such as DVDs and CD-ROMs, in which the program is recorded are sold. In addition, the program may be stored in a storage device of a server computer and then transferred from the server computer to another computer via a network.

A computer for executing the program stores the program, which is originally recorded in a portable storage medium or transferred from the server computer, in its own storage device. Subsequently, the computer reads the program from the storage device and performs processing according to the program. Note that the computer is able to read the program directly from the portable storage medium and perform processing according to the program. In addition, the computer is able to sequentially perform processing according to a received program each time such a program is transferred from the server computer connected via a network.

According to one aspect, it is possible to shorten an overall response time to a plurality of write requests sequentially transmitted from the same source while keeping the processing load low.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a processor configured to perform a procedure including:
identifying a plurality of write requests received from a same source at intervals each within a predetermined time period; and
determining to perform a write operation employing a first-method deduplication process for first write requests that are a preset number of write requests selected amongst the plurality of write requests in reverse chronological order according to reception times individually associated with the plurality of write requests, and perform the write operation employing a second-method deduplication process for second write requests that are rest of the plurality of write requests other than the first write requests,
wherein the first-method deduplication process includes writing first write data to a storage area and transmitting a response, and deduplicating the first write data in the storage area at a later time,
the second-method deduplication process includes deduplicating second write data, writing the deduplicated second write data to the storage area, and then transmitting the response, and
the preset number is set based on a minimum interval of write requests sequentially issued from the source, a time period in the first-method deduplication process from reception of each write request to transmission of the response, and a time period in the second-method deduplication process from reception of each write request to transmission of the response.

2. The information processing apparatus according to claim 1, wherein:
the preset number is set in such a manner that a first time point at which the response to a last write request amongst the second write requests is transmitted falls on or before, but closest to, a second time point at which the response to a last write request amongst the first write requests is transmitted.

3. The information processing apparatus according to claim 1, wherein:
the identifying includes detecting a write pattern in which the plurality of write requests appear a plurality of times at constant intervals each longer than the predetermined time period, and
the determining includes:
determining to perform the write operation employing the second-method deduplication process for all the plurality of write requests until the write pattern is detected, and
identifying, as a first write request group, the plurality of write requests received after the write pattern is detected, and determining to perform the write operation employing the first-method deduplication process for the first write requests included in the first write request group and perform the write operation employing the second-method deduplication process for the second write requests included in the first write request group.

4. The information processing apparatus according to claim 3, wherein:
the determining includes:
upon identifying, as a second write request group, the plurality of write requests received after the first write request group,
determining to perform the write operation employing the first-method deduplication process for the first write requests included in the second write request group and perform the write operation employing the second-method deduplication process for the second write requests included in the second write request group when a reception interval between the first write request group and the second write request group is smaller than each of the constant intervals, and
determining to perform the write operation employing the second-method deduplication process for all the plurality of write requests included in the second write request group when the reception interval is not smaller than each of the constant intervals.

5. The information processing apparatus according to claim 1, wherein:
the storage area is implemented as a collection of storage apparatuses individually deployed on a plurality of storage nodes in a distributed manner,
the first-method deduplication process includes writing the first write data in one of the storage apparatuses of the storage nodes and transmitting the response, and reading the first write data at the later time, then deduplicating the first write data, and writing the deduplicated first write data in one of the storage apparatuses of the storage nodes, and
the second-method deduplication process includes deduplicating the second write data, then writing the deduplicated second write data in one of the storage apparatuses of the storage nodes, and transmitting the response.

6. An information processing method comprising:
identifying, by a computer, a plurality of write requests received from a same source at intervals each within a predetermined time period; and
determining, by the computer, to perform a write operation employing a first-method deduplication process for first write requests that are a preset number of write requests selected amongst the plurality of write requests in reverse chronological order according to reception times individually associated with the plurality of write requests, and perform the write operation employing a second-method deduplication process for second write requests that are rest of the plurality of write requests other than the first write requests,
wherein the first-method deduplication process includes writing first write data to a storage area and transmitting a response, and deduplicating the first write data in the storage area at a later time,
the second-method deduplication process includes deduplicating second write data, writing the deduplicated second write data to the storage area, and then transmitting the response, and
the preset number is set based on a minimum interval of write requests sequentially issued from the source, a time period in the first-method deduplication process from reception of each write request to transmission of the response, and a time period in the second-method deduplication process from reception of each write request to transmission of the response.

7. A non-transitory computer-readable storage medium storing a computer program that causes a computer to perform a procedure comprising:
identifying a plurality of write requests received from a same source at intervals each within a predetermined time period; and determining to perform a write operation employing a first-method deduplication process for first write requests that are a preset number of write requests selected amongst the plurality of write requests in reverse chronological order according to reception times individually associated with the plurality of write requests, and perform the write operation employing a second-method deduplication process for second write requests that are rest of the plurality of write requests other than the first write requests, wherein the first-method deduplication process includes writing first write data to a storage area and transmitting a response, and deduplicating the first write data in the storage area at a later time, the second-method deduplication process includes deduplicating second write data, writing the deduplicated second write data to the storage area, and then transmitting the response, and the preset number is set based on a minimum interval of write requests sequentially issued from the source, a time period in the first-method deduplication process from reception of each write request to transmission of the response, and a time period in the second-method deduplication process from reception of each write request to transmission of the response.

* * * * *